United States Patent
Choi

(10) Patent No.: US 12,206,329 B2
(45) Date of Patent: Jan. 21, 2025

(54) DC/DC CONVERTER USING PARTIAL RESONANCE AND CONTROL METHOD THEREOF

(71) Applicant: Samsung Electronics Co., Ltd., Suwon-si (KR)

(72) Inventor: Kyusik Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 332 days.

(21) Appl. No.: 17/674,100

(22) Filed: Feb. 17, 2022

(65) Prior Publication Data

US 2022/0321008 A1 Oct. 6, 2022

Related U.S. Application Data

(63) Continuation of application No. PCT/KR2022/000174, filed on Jan. 5, 2022.

(30) Foreign Application Priority Data

Mar. 30, 2021 (KR) .......... 10-2021-0040872
Oct. 19, 2021 (KR) .......... 10-2021-0139449

(51) Int. Cl.
*H02M 3/158* (2006.01)
*H02M 3/00* (2006.01)

(52) U.S. Cl.
CPC ............. *H02M 3/158* (2013.01); *H02M 3/01* (2021.05)

(58) Field of Classification Search
CPC ....... H02M 3/158; H02M 3/1588; H02M 3/01
See application file for complete search history.

(56) References Cited

U.S. PATENT DOCUMENTS 6,242,896 B1 6/2001 Nieberger
10,651,736 B1 * 5/2020 Lazaro ................ H02M 7/4837
(Continued)

FOREIGN PATENT DOCUMENTS

CN 108712073 A 10/2018
JP 2017-077096 A 4/2017
(Continued)

OTHER PUBLICATIONS

International Search Report with Written Opinion and English translation dated Apr. 14, 2022; International Appln. No. PCT/KR2022/000174.
(Continued)

*Primary Examiner* — Gary L Laxton
(74) *Attorney, Agent, or Firm* — Jefferson IP Law, LLP

(57) ABSTRACT

A direct current (DC)/DC converter is provided. The DC/DC converter includes multiple switches, a capacitor, an inductor, and at least one processor, wherein, when the output voltage of the DC/DC converter is less than a first threshold voltage, the at least one processor is configured to control an on/off state of the multiple switches so as to increase the current output from the inductor based on the current, which is output from the inductor, being less than a first threshold current, and control a second switch and a fourth switch to be in an on state or control a first switch and a third switch be in the on state to allow one end or the other end of the capacitor to be connected to one end of the inductor, based on the current, which is output from the inductor, being increased to be greater than or equal to the first threshold current.

22 Claims, 21 Drawing Sheets

(56) References Cited

U.S. PATENT DOCUMENTS

| | | |
|---|---|---|
| 11,437,929 B2* | 9/2022 | Ilic .................. H02M 1/083 |
| 2014/0232364 A1 | 8/2014 | Thomas et al. |
| 2018/0101207 A1 | 4/2018 | Bharath et al. |
| 2019/0115823 A1 | 4/2019 | Lidsky et al. |
| 2019/0207519 A1 | 7/2019 | Chakraborty et al. |
| 2019/0379287 A1 | 12/2019 | Zhang et al. |
| 2020/0195133 A1 | 6/2020 | Bonnano et al. |

FOREIGN PATENT DOCUMENTS

| | | |
|---|---|---|
| KR | 10-1301179 B1 | 8/2013 |
| KR | 10-2020-0122055 A | 10/2020 |
| KR | 10-2021-0017472 A | 2/2021 |
| WO | 2017/156638 A1 | 9/2017 |
| WO | 2020/106352 A2 | 5/2020 |

OTHER PUBLICATIONS

Kim et al.; A Fully-Integrated 3-Level DC-DC Converter for Nanosecond-Scale DVFS; IEEE Journal of Solid-State Circuits; vol. 47, No. 1; Jan. 2012; Nov. 18, 2011; Harvard University, Cambridge, MA.

* cited by examiner

DC/DC CONVERTER USING PARTIAL RESONANCE AND CONTROL METHOD THEREOF

CROSS-REFERENCE TO RELATED APPLICATION(S)

This application is a continuation application, claiming priority under § 365(c), of an International application No. PCT/KR2022/000174, filed on Jan. 5, 2022, which is based on and claims the benefit of a Korean patent application number 10-2021-0040872, filed on Mar. 30, 2021, in the Korean Intellectual Property Office, and of a Korean patent application number 10-2021-0139449, filed on Oct. 19, 2021, in the Korean Intellectual Property Office, the disclosure of each of which is incorporated by reference herein in its entirety.

TECHNICAL FIELD

The disclosure relates to a direct current (DC)/DC converter using partial resonance, and a method for controlling the same. More particularly, the disclosure relates to a DC/DC converter and a method for controlling the same, wherein the same has the structure of a 3-level buck converter, and partial resonance is used to increase the inductor current before a resonant period.

BACKGROUND ART

A direct current (DC)/DC converter may receive a DC voltage, convert the same to a DC voltage of a configured magnitude, and output the same. For example, DC/DC converters may include a boost converter configured to convert a relative low input voltage to a relative high output voltage, a buck converter configured to convert a relative high input voltage to a relative low output voltage, and a buck/boost converter capable of converting an input voltage to a relative low output voltage or a relative high output voltage according to switching control.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

A buck converter (for example, 2-level buck converter) refers to a typical voltage-dropping power converter including two switches, an inductor, and a capacitor. Buck converters are advantageous in that they can provide high power conversion efficiencies of about 80-90%, and control design is easy and stable. However, buck converters have drawbacks in that a larger inductor is necessary in the case of a large difference between the input voltage and the output voltage. It has been proposed to increase the switching frequency in an effort to resolve such drawbacks, but this approach may lower the power conversion efficiency.

Other examples of the buck converter include a 3-level hard switching buck converter and a 3-level resonant buck converter.

The 3-level hard switching buck converter may be configured such that a 2:1 switched capacitor and a normal buck converter (for example, 2-level buck converter) are connected in series. The 3-level hard switching buck converter may supply an inductor input voltage $V_{in}$ at three levels (for example, $V_{in}$, $V_{in}/2$, 0) and, even in the case of a large difference between the input voltage and the output voltage $V_o$ (for example, when $V_o/V_{in}$ is low), may provide a higher efficiency than a normal buck converter (for example, 2-level buck converter). However, there are limitations in that, since the 3-level hard switching buck converter uses a hard switching scheme, it is difficult to increase the switching frequency, and it is difficult to reduce the inductor size to a predetermined size or less.

The 3-level resonant buck converter uses a soft switching scheme so as to switch to frequencies near resonance frequencies of a flying capacitor and an inductor. The 3-level resonant buck converter uses a soft switching scheme and thus may have a lower level of switching loss than the three-level hard switching buck converter. The 3-level resonant buck converter is advantageous in that it is relatively easy to increase the switching frequency because the power conversion efficiency is not seriously degraded even if the switching frequency is high, and the same can be designed with small-sized inductor and capacitor. In order to guarantee accurate LC resonance, it may be required, in the case of the 3-level resonant buck converter, that the ratio between the input and output voltages (for example, $V_o/V_{in}$) is 0.5, and there is no loss. However, $V_o/V_{in}$ may vary in actual use environments, and loss components may exist. This may pose a problem in that accurate LC resonance does not occur, the current (for example, output current $I_o$) that can be supplied to the load may decrease. A partial resonant 3-level buck converter has been proposed in an attempt to address such issues, and no specific scheme has been proposed to increase the inductor current when the input voltage is low compared with the output voltage (for example, 2 $V_o/V_{in}$ is low). There may also a problem in that optimal operations are difficult to obtain, due to element deviations or the like, by using a look-up table or the like. Furthermore, there have been proposed no method for applying an interleaving technology to the 3-level resonant buck converter, and no method for applying a coupled inductor thereto.

Aspects of the disclosure are to address at least the above-mentioned problems and/or disadvantages and to provide at least the advantages described below. Accordingly, an aspect of the disclosure is to provide a DC/DC converter and a method for controlling the same, wherein the same has the structure of a 3-level buck converter, and partial resonance is used to increase the inductor current before a resonant period.

Another aspect of the disclosure is to provide a DC/DC converter and a method for controlling the same, wherein an interleaving technology is used to counterbalance the ripple of the inductor current.

Another aspect of the disclosure is to provide a DC/DC converter including a coupled inductor and a method for controlling the same.

Additional aspects will be set forth in part in the description which follows and, in part, will be apparent from the description, or may be learned by practice of the presented embodiments.

Technical Solution

In accordance with an aspect of the disclosure, a DC/DC converter is provided. The DC/DC converter includes multiple switches, a capacitor, an inductor, and at least one processor, wherein the multiple switches include a first switch having one end connected to an input power source and configured to connect one end of the capacitor to the input power source when the first switch is in an on state, a second switch having one end connected to the other end of the first switch and configured to connect one end of the capacitor to one end of the inductor when the second switch is in the on state, a third switch having one end connected to the other end of the second switch and configured to connect the other end of the capacitor to one end of the inductor when the third switch is in the on state, and a fourth switch having one end connected to the other end of the third switch and configured to connect the other end of the capacitor to the ground when the fourth switch is in the on state, wherein the capacitor has one end connected to the other end of the first switch and one end of the second switch, and the other end connected to the other end of the third switch and one end of the fourth switch, wherein the inductor has one end connected to the other end of the second switch and one end of the third switch, and the other end connected to the output end of the DC/DC converter, and wherein the at least one processor is configured to, when the output voltage of the DC/DC converter is less than a first threshold voltage, based on the current, which is output from the inductor, being less than a first threshold current, control the on/off state of the multiple switches so as to increase the current output from the inductor, and based on the current, which is output from the inductor, being increased to be greater than or equal to the first threshold current, control the second switch and the fourth switch to be in the on state or control the first switch and the third switch be in the on state to allow one end or the other end of the capacitor to be connected to one end of the inductor.

In accordance with another aspect of the disclosure, a method for controlling a DC/DC converter is provided. The DC/DC converter includes multiple switches, a capacitor, and an inductor, wherein the multiple switches include a first switch having one end connected to an input power source and configured to connect one end of the capacitor to the input power source when the first switch is in an on state, a second switch having one end connected to the other end of the first switch and configured to connect one end of the capacitor to one end of an inductor when the second switch is in the on state, a third switch having one end connected to the other end of the second switch and configured to connect the other end of the capacitor to one end of the inductor when the third switch is in the on state, and a fourth switch having one end connected to the other end of the third switch and configured to connect the other end of the capacitor to the ground when the fourth switch is in the on state, wherein the capacitor has one end connected to the other end of the first switch and one end of the second switch, and the other end connected to the other end of the third switch and one end of the fourth switch, wherein the inductor has one end connected to the other end of the second switch and one end of the third switch, and the other end connected to the output end of the DC/DC converter, and wherein the method includes, when the output voltage of the DC/DC converter is less than a first threshold voltage, based on the current, which is output from the inductor, being less than a first threshold current, controlling the on/off state of the multiple switches so as to increase the current output from the inductor, and based on the current, which is output from the inductor, being increased to be greater than or equal to the first threshold current, controlling the second switch and the fourth switch to be in the on state or controlling the first switch and the third switch be in the on state to allow one end or the other end of the capacitor to be connected to one end of the inductor.

Advantageous Effects

According to various embodiments of the disclosure, a DC/DC converter and a method for controlling the same may increase the inductor current before a resonant period, thereby improving a high power conversion efficiency even when the input voltage is low compared with the output voltage (for example, 2 $V_0/V_{in}$ is larger than 1). In addition, a high switching frequency can be configured, and the DC/DC converter can be configured even with an inductor (L) having a small inductance and a small resistance, thereby increasing the power conversion efficiency of the DC/DC converter.

According to various embodiments of the disclosure, a DC/DC converter and a method for controlling the same may optimize application of an interleaving technology. This makes it possible to configure the DC/DC converter even with small inductor (L) and capacitor ($C_{fly}$), thereby reducing the size of the DC/DC converter.

According to various embodiments of the disclosure, a DC/DC converter may include a coupled inductor, thereby decreasing the inductor current peak, and increasing the rising and/or dropping slopes of the inductor current. Accordingly, the form of the inductor current ($I_L$) is from a sinusoidal wave to a square wave, there reducing the root mean square (RMS) current, and decreasing conductance loss.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
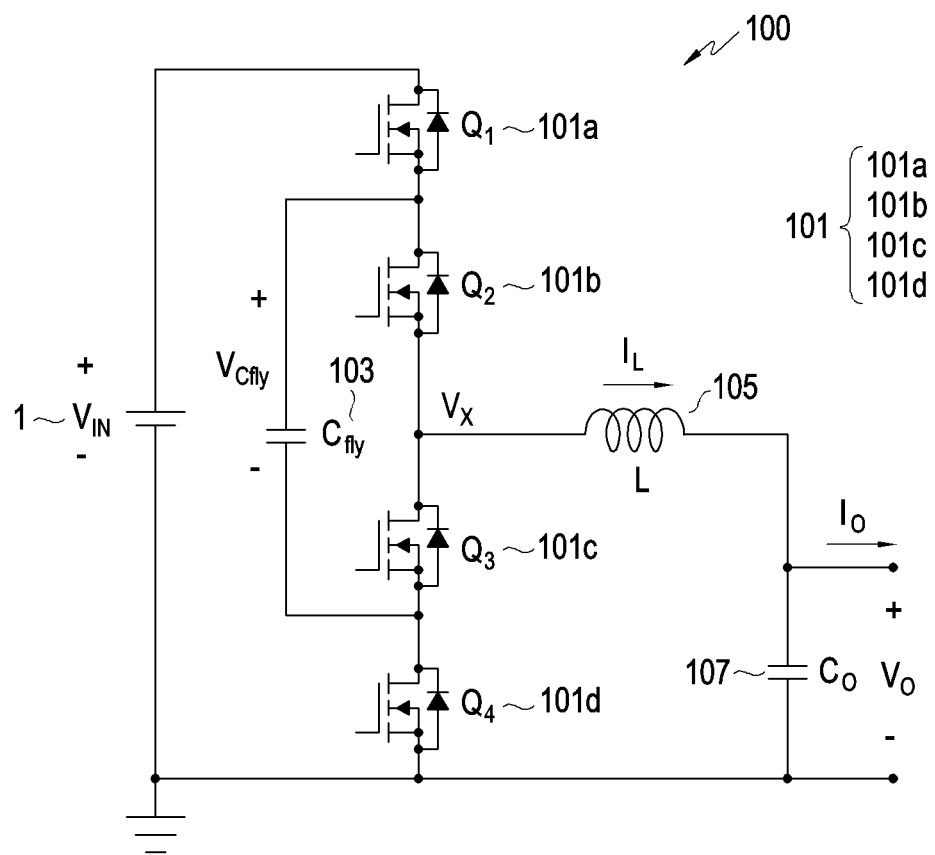
FIG. 1 illustrates elements of a direct current (DC)/DC converter according to an embodiment of the disclosure.

FIG. 1 illustrates elements of a DC/DC converter (e.g., a 3-level buck converter) according to an embodiment of the disclosure.

Referring to FIG. 1, according to various embodiments of the disclosure, a DC/DC converter 100 may include multiple switches 101, a first capacitor 103 (e.g., a flying capacitor), a first inductor 105, and/or a second capacitor 107.

According to various embodiments of the disclosure, the multiple switches 101 may include a first switch 101a (Q1), a second switch 101b (Q2), a third switch 101c (Q3), and/or a fourth switch 101d (Q4). According to various embodiments of the disclosure, each of the multiple switches 101 may be implemented as a metal-oxide-semiconductor field-effect transistor (MOSFET). According to an embodiment of the disclosure, at least some of the multiple switches 101 may be implemented as diodes.

According to various embodiments of the disclosure, each of the multiple switches 101 may be controlled to be on state or off state under the control of a controller (not shown) (e.g., a gate driver or a driving circuit) (or according to a control signal to be output (or a gate voltage)). For example, the controller (not shown) may generate a control signal (e.g., a pulse width modulation (PWM) signal). The controller (not shown) may be connected to each of the multiple switches 101, and may input a control signal to each of the multiple switches 101 (e.g., apply a voltage to a gate terminal of each of the multiple switches 101). According to various embodiments of the disclosure, the control of the on/off state of the multiple switches 101 may include application and/or non-application of a control signal (or gate voltage) to the switches 101. In various embodiments of the disclosure, controlling the on/off state of the switches 101 by the controller (not shown) may be understood as including outputting the gate voltage and/or refraining from outputting the gate voltage by the controller (not shown). According to various embodiments of the disclosure, the controller (not shown) may control the on/off state of each of the multiple switches 101 based on an input voltage of the DC/DC converter 100 (e.g., voltage $V_{in}$ of the input power source 1), a switch node voltage $V_x$ (e.g., voltage at the input terminal of the first inductor 105), a current flowing through the first inductor 105 (or output current $I_L$ of the first inductor 105), and/or the output voltage $V_o$ of the DC/DC converter 100. For example, the controller (not shown) may include at least one comparator. The controller (not shown) may compare the inductor current $I_L$ with at least one threshold current, may compare the output voltage $V_o$ with at least one threshold voltage, or may compare the switch node voltage $V_x$ with at least one threshold voltage, and based on a result of the comparison, the controller may control the on/off state of each of the multiple switches 101. According to an embodiment of the disclosure, the controller (not shown) may be implemented as a micro controller unit (MCU), and the MCU may control the gate driver to control the on/off state of each of the multiple switches 101. According to various embodiments of the disclosure, the above-described controller (not shown) may be included in the DC/DC converter 100. According to an embodiment of the disclosure, the above-described controller (not shown) may be disposed outside the DC/DC converter 100 without being included in the DC/DC converter 100, and thus may be operatively connected with the DC/DC converter 100.

According to various embodiments of the disclosure, one end of the first switch 101a may be connected to the input power source 1, and the other end thereof may be connected to one end of the first capacitor 103 and one end of the second switch 101b. According to various embodiments of the disclosure, when the first switch 101a is in on state, one end of the first capacitor 103 may be connected to the input power source 1. According to various embodiments of the disclosure, when the first switch 101a is in off state, one end of the first capacitor 103 may be disconnected from the input power source 1.

According to various embodiments of the disclosure, one end of the second switch 101b is connected to the other end of the first switch 101a and one end of the first capacitor 103, and the other end of the second switch is connected to one end of the first inductor 105 and one end of the third switch 101c. According to various embodiments of the disclosure, when the second switch 101b is in on state, one end of the first capacitor 103 may be connected to one end of the first inductor 105. According to various embodiments of the disclosure, when the second switch 101b is in off state, one end of the first capacitor 103 may be disconnected from one end of the first inductor 105.

According to various embodiments of the disclosure, one end of the third switch 101c may be connected to the other end of the second switch 101b and one end of the first inductor 105, and the other end of the third switch may be connected to the other end of the first capacitor 103 and one end of the fourth switch 101d. According to various embodiments of the disclosure, when the third switch 101c is in on state, the other end of the first capacitor 103 may be connected to one end of the first inductor 105. According to various embodiments of the disclosure, when the third switch 101c is in off state, the other end of the first capacitor 103 may be disconnected from the other end of the first inductor 105.

According to various embodiments of the disclosure, one end of the fourth switch 101d may be connected to the other end of the first capacitor 103 and the other end of the third switch 101c, and the other end of the fourth switch may be connected to the ground. According to various embodiments of the disclosure, when the fourth switch 101d is in on state, the other end of the first capacitor 103 may be connected to the ground. According to various embodiments of the disclosure, when the fourth switch 101d is in off state, the other end of the first capacitor 103 may be disconnected from the ground.

According to various embodiments of the disclosure, one end of the first capacitor 103 may be connected to the other end of the first switch 101a and one end of the second switch 101b, and the other end of the first capacitor may be connected to the other end of the third switch 101c and one end of the fourth switch 101d. According to various embodiments of the disclosure, one end of the first inductor 105 may be connected to the other end of the second switch 101b and one end of the third switch 101c, and the other end of the inductor may be connected to the output terminal (e.g., the second capacitor 107) of the DC/DC converter 100. According to various embodiments of the disclosure, when the first switch 101a and the third switch 101c are in on state or the second switch 101b and the fourth switch 101d are in on state, the first capacitor 103 and the first inductor 105 may be connected in series to configure a resonance circuit.

According to various embodiments of the disclosure, the states of the DC/DC converter 100 may be defined according to the on/off state of the multiple switches 101, and this will be described below with reference to the drawings below.

Figure 2:
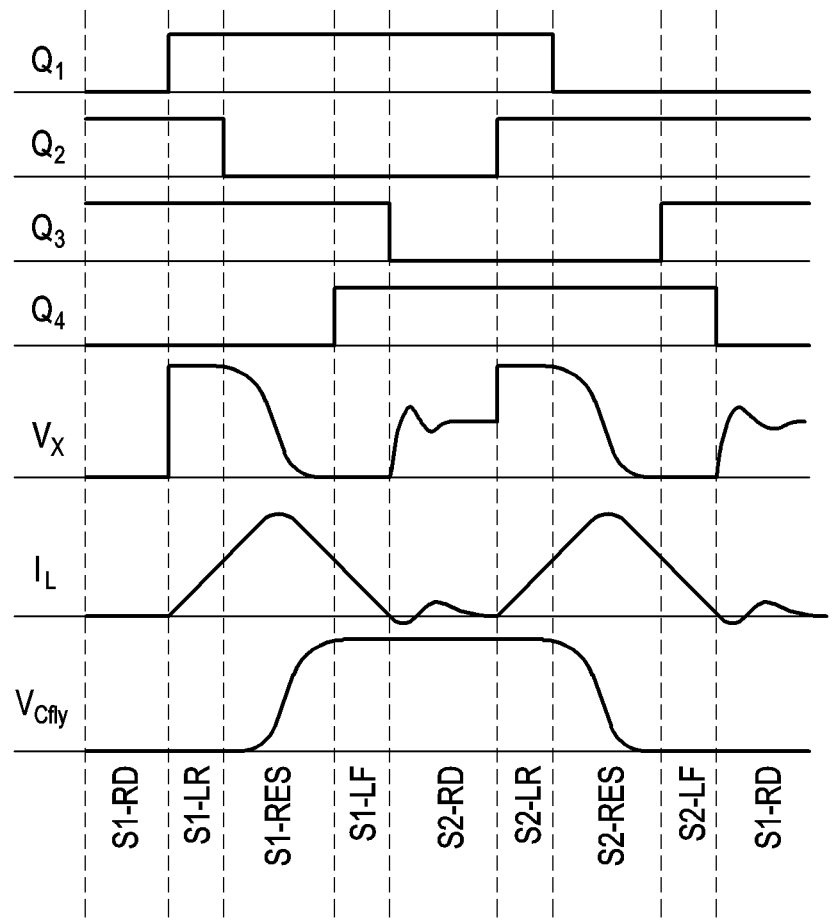
FIG. 2 illustrates states of a DC/DC converter according to an on/off state of multiple switches according to an embodiment of the disclosure.

FIG. 2 illustrates states of a DC/DC converter according to an on/off state of multiple switches according to an embodiment of the disclosure.

Figure 3:
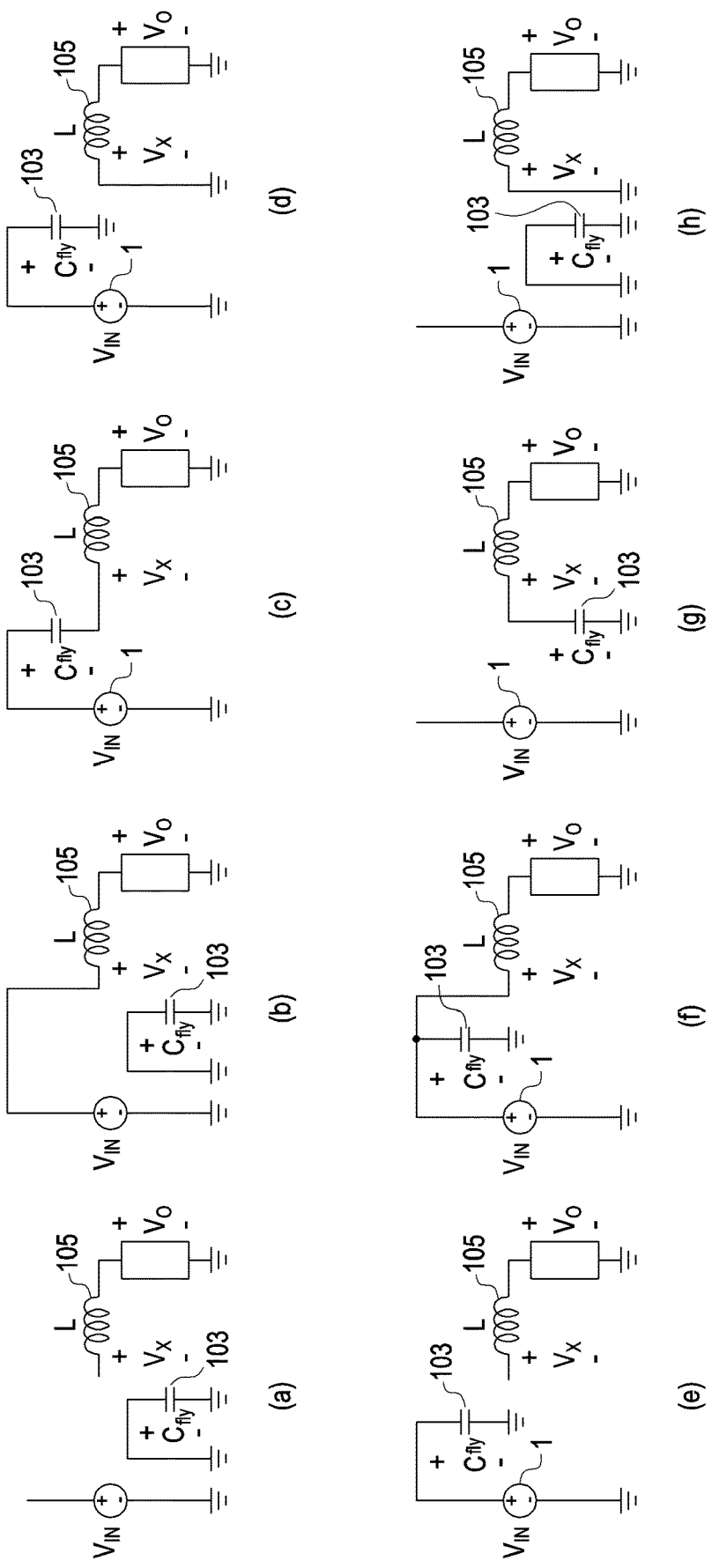
FIG. 3 is an equivalent circuit diagram illustrating states of a DC/DC converter according to an embodiment of the disclosure.

Parts (a) to (h) of FIG. 3 are equivalent circuit diagrams illustrating states of the DC/DC converter according to various embodiments of the disclosure.

Referring to FIG. 2, according to various embodiments of the disclosure, the DC/DC converter 100 may be in multiple states, and the multiple states may include, for example, the states of Table 1.

TABLE 1

| State   | Q1         | Q2         | Q3         | Q4         |
|---------|------------|------------|------------|------------|
| S1_RD   | OFF        | ON         | ON         | OFF        |
| S1_LR   | ON         | ON         | Don't care | OFF        |
| S1_RES  | ON         | OFF        | ON         | OFF        |
| S1_LF   | Don't care | OFF        | ON         | ON         |
| S2_RD   | ON         | OFF        | OFF        | ON         |
| S2_LR   | ON         | ON         | OFF        | Don't care |
| S2_RES  | OFF        | ON         | OFF        | ON         |
| S2_LF   | OFF        | Don't care | ON         | ON         |

In Table 1, "Don't care" indicates a state in which a corresponding switch can be in any one of on state and off state, and may be marked as "–" in the drawing to be described later.

Hereinafter, for convenience of explanation, controlling the multiple switches 101 to be on/off state corresponding to any one state by the DC/DC converter 100 may be understood as that the DC/DC converter 100 enters a state corresponding to the on/off state of the multiple switches 101 or is maintained in a state corresponding to the on/off state of the multiple switches 101.

Referring to part (a) of FIG. 3, an equivalent circuit diagram of the DC/DC converter 100 in the state 1 ready (S1_RD state) of Table 1 is shown. The S1_RD state may be a waiting period in a state in which voltage $V_{cfly}$ across both ends of the first capacitor 103 (hereinafter, the voltage of the first capacitor 103) is 0 V. Referring to FIG. 2, in the S1_RD state, the first capacitor 103 may not be connected to the input power source 1 and the first inductor 105, and the first inductor 105 may not be connected to the input power source 1 and the first capacitor 103. Based on the first capacitor 103 not being connected to the input power source 1 and the first inductor 105, the voltage $V_{cfly}$ of the first capacitor 103 may be 0 V, and based on the first inductor 105 not being connected to the input power source 1 and the first capacitor 103, the current $I_L$ of the inductor 105 (hereinafter, the inductor current) may be 0 A.

Referring to part (b) of FIG. 3, an equivalent circuit diagram of the DC/DC converter 100 in a state 1 linear rising (S1_LR state) of Table 1 is shown. The S1_LR state may be a period in which the inductor current $I_L$ linearly increases while the voltage $V_{cfly}$ across the first capacitor 103 is 0 V. Referring to FIG. 2, in the S1_LR state, the first capacitor 103 may not be connected to the input power source 1 and the first inductor 105, and the first inductor 105 may be connected to the input power source 1. Based on the first capacitor 103 not being connected to the input power source 1 and the first inductor 105, the voltage $V_{cfly}$ of the first capacitor 103 may be 0 V. Based on the first inductor 105 being connected to the input power source 1, the switch node voltage $V_x$ may increase to the voltage $V_{in}$ (hereinafter, the input voltage) of the input power source 1. Based on the first inductor 105 being connected to the input power source 1, the inductor current $I_L$ may increase linearly.

Referring to part (c) of FIG. 3, an equivalent circuit diagram of the DC/DC converter 100 in the state 1 resonance (S1_RES state) of Table 1 is shown. The S1_RES state may be a period in which the first capacitor 103 and the first inductor 105 are connected to configure a series resonance circuit in a state where the voltage $V_{cfly}$ of the first capacitor 103 is 0 V. Referring to FIG. 2, in the S1_RES state, the first capacitor 103 may be connected to the input power source 1 and the first inductor 105, and the first inductor 105 may be connected to the first capacitor 103. Based on the connection to the input power source 1, the first capacitor 103 is charged based on the input voltage $V_{in}$, and thus the voltage $V_{cfly}$ of the first capacitor 103 may increase and the switch node voltage $V_x$ may fall. Based on the connection between the first inductor 105 and the first capacitor 103, the inductor current $I_L$ may increase and then fall due to resonance with the first capacitor 103.

Referring to part (d) of FIG. 3, an equivalent circuit diagram of the DC/DC converter 100 in the state 1 linear falling (S1_LF state) of Table 1 is shown. The S1_LF state may be a period in which the inductor current $I_L$ linearly falls while the voltage $V_{cfly}$ of the first capacitor 103 is $V_{in}$ (V). Referring to FIG. 2, in the S1_LF state, the first capacitor 103 may be connected to the input power source 1, the first inductor 105 may be connected to the ground, and the first capacitor 103 and the first inductor 105 may not be connected to each other. Based on the first capacitor 103 being connected to the input power source 1 without being connected to the first inductor 105, the voltage $V_{cfly}$ of the first capacitor 103 may be maintained at $V_{in}$ (V). Based on the inductor 105 being connected to the ground without being connected to the first capacitor 103, the switch node voltage $V_x$ may be maintained at 0 V and the inductor current $I_L$ may drop linearly.

Referring to part (e) of FIG. 3, an equivalent circuit diagram of the DC/DC converter 100 in the state 2 ready (S2_RD state) of Table 1 is shown. The S2_RD state may be a waiting period in a state in which the voltage $V_{cfly}$ of the first capacitor 103 is $V_{in}$ (V). Referring to FIG. 2 together, in the S2_RD state, the first capacitor 103 may be connected to the input power source 1 without being connected to the first inductor 105, and the first inductor 105 may not be connected to the input power source 1 and the first capacitor 103. Based on the connection between the first capacitor 103 and the input power source 1, the voltage $V_{cfly}$ of the first capacitor 103 may be maintained at $V_{in}$ (V). Based on the first inductor 105 not being connected to the first capacitor 103, the inductor current $I_L$ may be about 0 A, and the switch node voltage $V_x$ may be maintained at about $V_{in}/2$ (V).

Referring to part (f) of FIG. 3, an equivalent circuit diagram of the DC/DC converter 100 in a state 2 linear rising (S2_LR state) of Table 1 is shown. The S2_LR state may be a period in which the inductor current $I_L$ linearly increases while the voltage $V_{cfly}$ of the first capacitor 103 is $V_{in}$ (V). Referring to FIG. 2, in the S2_LR state, the first capacitor 103 may be connected to the input power source 1 and the first inductor 105, and the first inductor 105 may be connected to the input power source 1 and the first capacitor 103. Based on the first capacitor 103 being connected to the input power source 1, the voltage $V_{cfly}$ of the first capacitor 103 may be maintained at $V_{in}$ (V). Based on the first inductor 105 being connected to the first capacitor 103 and the input power source 1, the switch node voltage $V_x$ may increase to the input voltage $V_{in}$, and the inductor current $I_L$ may increase linearly.

Referring to part (g) of FIG. 3, an equivalent circuit diagram of the DC/DC converter 100 in the state 2 resonance (S2_RES state) of Table 1 is shown. The S2_RES state may be a period in which the first capacitor 103 and the first inductor 105 are connected to configure a series resonance circuit while the voltage $V_{cfly}$ of the first capacitor 103 is $V_{in}$ (V). Referring to FIG. 2, in the S2_RES state, the first capacitor 103 may be connected to the first inductor 105 without being connected to the input power source 1, and the first inductor 105 may be connected to the first capacitor 103. Based on being connected to the first inductor 105 without being connected to the input power source 1, the first capacitor 103 is discharged and thus the switch node voltage $V_x$ and the voltage $V_{cfly}$ of the first capacitor 103 may fall. Based on the connection between the first inductor 105 and the first capacitor 103, the inductor current $I_L$ may increase and then fall due to resonance with the first capacitor 103.

Referring to part (h) of FIG. 3, an equivalent circuit diagram of the DC/DC converter 100 in the state 2 linear falling (S2_LF state) of Table 1 is shown. The S2_LF state may be a period in which the inductor current $I_L$ linearly falls while the voltage $V_{cfly}$ of the first capacitor 103 is 0 V. Referring to FIG. 2 together, in the S2_LF state, the first capacitor 103 may not be connected to the input power source 1, the first inductor 105 may be connected to the ground, and the first capacitor 103 and the first inductor 105 may not be connected to each other. Based on the first capacitor 103 not being connected to the first inductor 105 and the input power source 1, the voltage $V_{cfly}$ of the first capacitor 103 may be maintained at 0 V. Based on the first inductor 105 being connected to the ground without being connected to the first capacitor 103, the switch node voltage $V_x$ may be maintained at 0 V and the inductor current $I_L$ may drop linearly.

According to various embodiments of the disclosure, the DC/DC converter 100 (e.g., a controller (not shown)) may control the on/off state of each of the multiple switches 101 based on an input voltage $V_{in}$, a switch node voltage $V_x$, an inductor current $I_L$, and/or the output voltage $V_o$ of the DC/DC converter 100. For example, the DC/DC converter 100 may maintain an Sx_RD state (e.g., S1_RD state or S2_RD state) while the output voltage $V_o$ of the DC/DC converter 100 is equal to or greater than a first threshold voltage $V_{o\_REF}$ to be described later, and if the output voltage $V_o$ is decreased to the first threshold voltage $V_{o\_REF}$ or less, the DC/DC converter 100 may enter another state (e.g., Sx_LR state or the Sx_RES state) from the Sx_RD state. For example, if the switch node voltage $V_x$ is decreased to a second threshold voltage (e.g., 0 V) or less to be described later, the DC/DC converter 100 may enter the Sx_LF state (or Sx_RD state) from the Sx_RES state. For example, if the output voltage $V_o$ is decreased less than the first threshold voltage $V_{o\_REF}$ and then the inductor current $I_L$ is decreased less than a first threshold current $I_{L\_B}$ to be described later, the DC/DC converter 100 may control the on/off state of the multiple switches 101 so as to increase the inductor current $I_L$ before entering the Sx_RES state, and then may enter the Sx_RES state. More specifically, in the Sx_RD state, if the output voltage $V_o$ is decreased less than the first threshold voltage $V_{o\_REF}$ and then the inductor current $I_L$ is less than the first threshold current $I_{L\_B}$ to be described later (e.g., when the inductor current is decreased less than the first threshold current $I_{L\_B}$ to be described later), the DC/DC converter 100 may enter the Sx_LR state, and then if the inductor current $I_L$ increases above the first threshold current $I_{L\_B}$, the DC/DC converter 100 may enter the Sx_RES state. According to various embodiments of the disclosure, the length of period of the Sx_LR state may be determined according to the value of the first threshold current $I_{L\_B}$, and the value of the first threshold current $I_{L\_B}$ may be changed. For example, in the Sx_RES state, if the switch node voltage $V_x$ is decreased to a second threshold voltage (e.g., 0 V) or less and then the inductor current $I_L$ is decreased to the second threshold current (e.g., 0 A) or less, the DC/DC converter 100 may decrease the value of the first threshold current $I_{L\_B}$. For example, in the Sx_RES state, if the inductor current $I_L$ is decreased to the second threshold current (e.g., 0 A) or less (or if the switch node voltage $V_x$ exceeds the second threshold voltage when the inductor current $I_L$ is decreased to the second threshold current or less) before the switch node voltage $V_x$ decreases to the second threshold voltage (e.g., 0 V) or less (e.g., in a state where the switch node voltage $V_x$ exceeds the second threshold voltage), the DC/DC converter 100 may increase the value of the first threshold current $I_{L\_B}$.

According to various embodiments of the disclosure, when the inductor current $I_L$ is decreased to the second threshold current (e.g., 0 A) or less in the Sx_RES or Sx_LF state, if the output voltage $V_o$ is less than the first threshold voltage $V_{o\_REF}$, the DC/DC converter 100 may increase the value of the first threshold current $I_{L\_B}$. For example, when the inductor current $I_L$ is decreased to a second threshold current (e.g., 0 A) or less in the Sx_RES or Sx_LF state, if the output voltage $V_o$ is greater than the first threshold voltage $V_{o\_REF}$, the DC/DC converter 100 may decrease the value of the first threshold current $I_{L\_B}$.

Figure 4A:
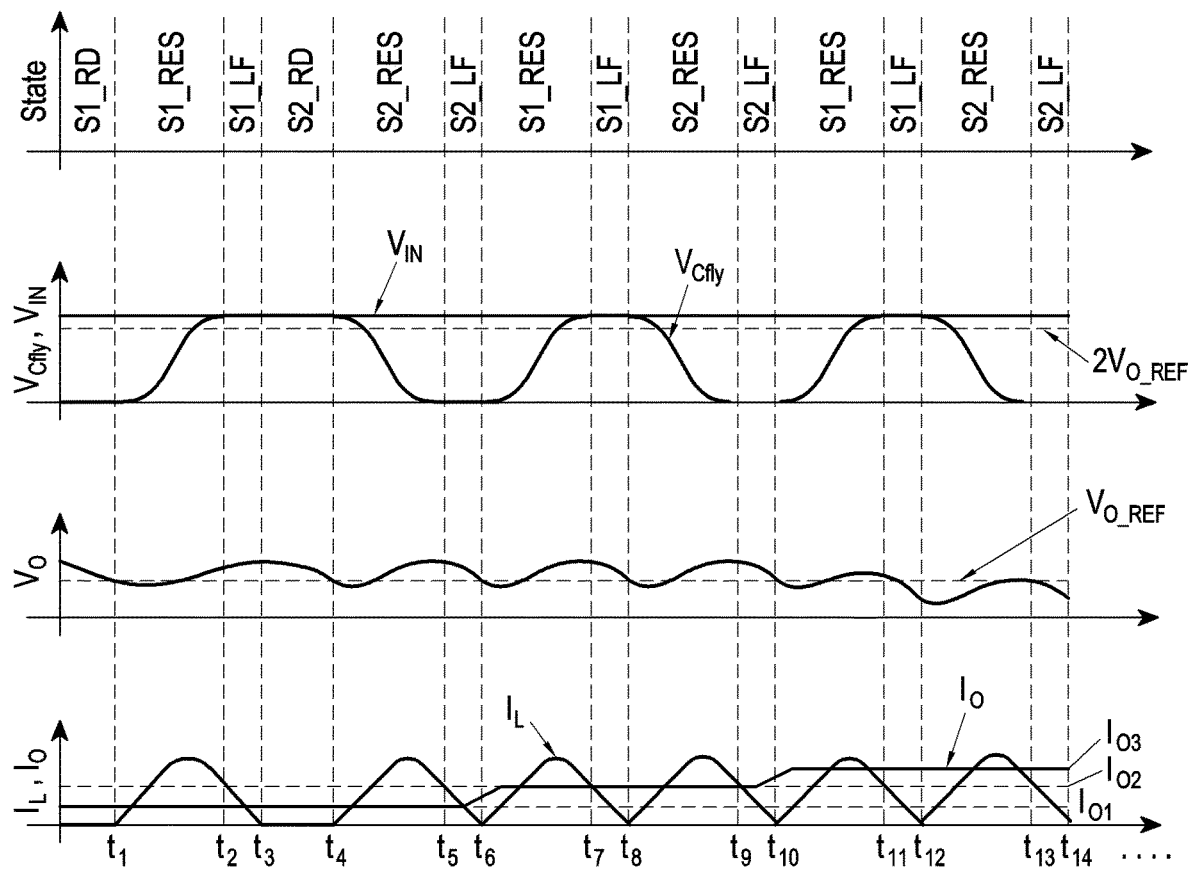
FIG. 4A illustrates switching control of a DC/DC converter while an input voltage of the DC/DC converter is greater than twice an output reference voltage according to an embodiment of the disclosure.
Figure 4B:
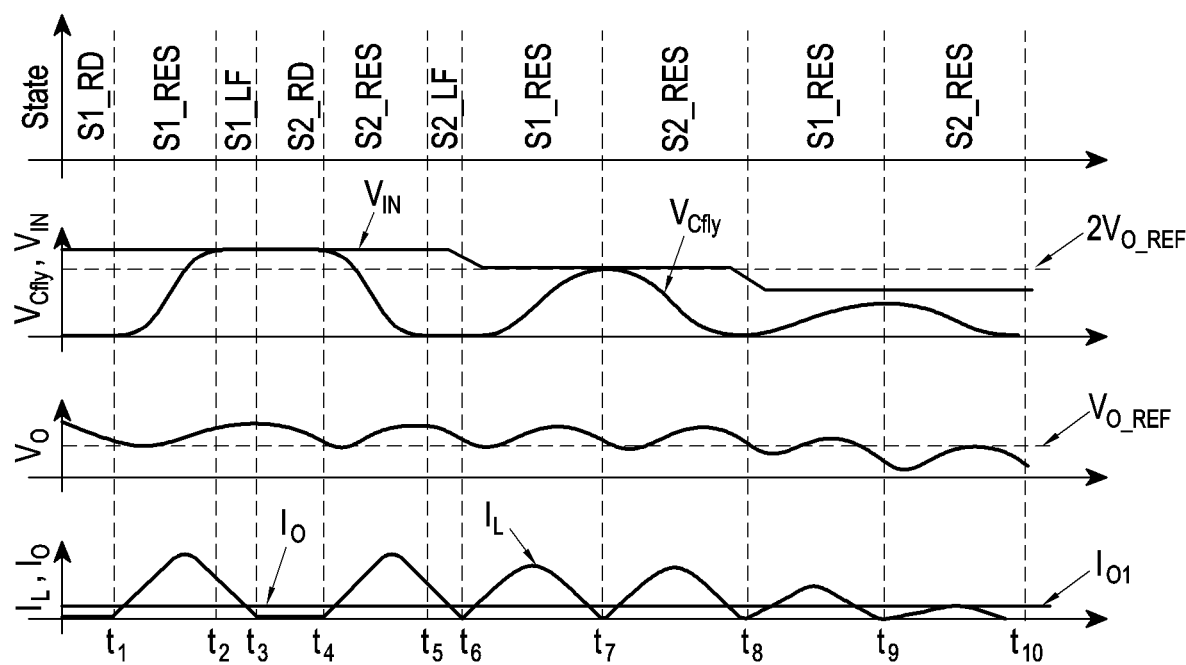
FIG. 4B illustrates switching control of a DC/DC converter while an input voltage of the DC/DC converter is equal to twice an output reference voltage according to an embodiment of the disclosure.
Figure 4C:
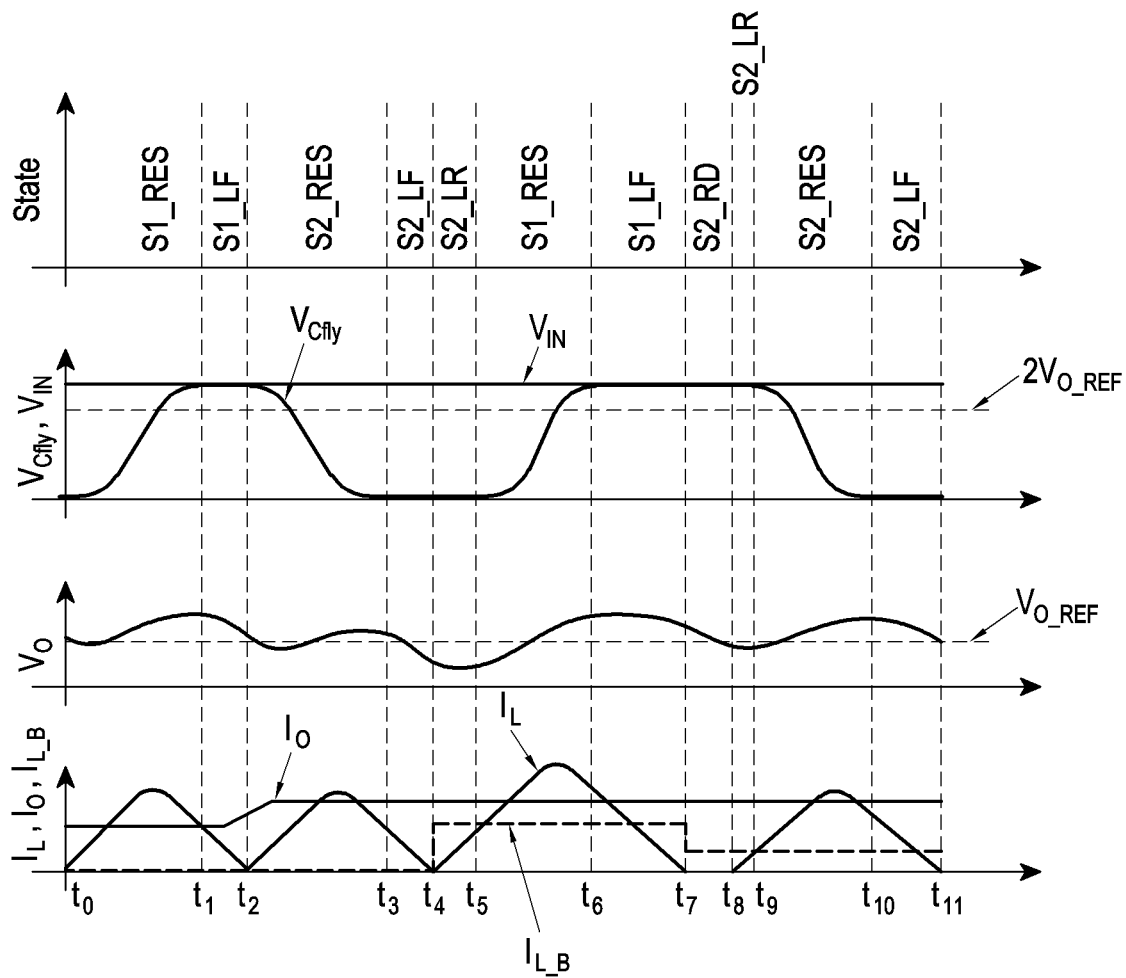
FIG. 4C illustrates switching control of a DC/DC converter while an input voltage of the DC/DC converter is smaller than twice an output reference voltage according to an embodiment of the disclosure.
Figure 4D:
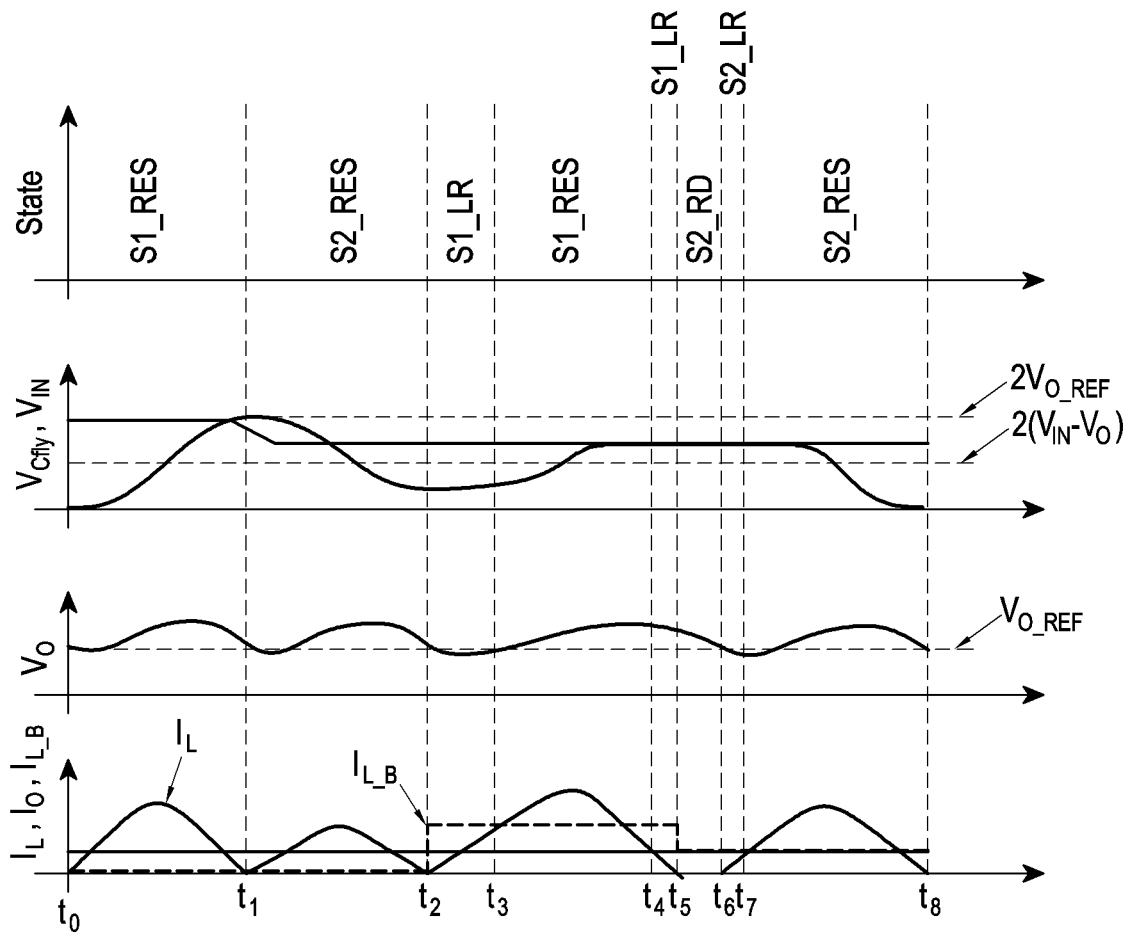
FIG. 4D illustrates switching control of a DC/DC converter while an input voltage of the DC/DC converter is greater than, equal to, or smaller than twice an output reference voltage according to an embodiment of the disclosure.

FIG. 4A illustrates switching control of a DC/DC converter according to a change in load current $I_o$ while an input voltage $V_{in}$ of the DC/DC converter is greater than twice ($2V_{o\_REF}$) an output reference voltage ($V_{o\_REF}$) according to an embodiment of the disclosure. FIG. 4B illustrates switching control of a DC/DC converter when an output current $I_o$ is fixed to $I_{o1}$ while an input voltage $V_{in}$ of the DC/DC converter is greater than, equal to, or less than twice ($2V_{o\_REF}$) an output reference voltage according to an embodiment of the disclosure. FIG. 4C illustrates switching control of a DC/DC converter through an added technique while an input voltage $V_{in}$ of a DC/DC converter is greater than twice ($2V_{o\_REF}$) an output reference voltage according to an embodiment of the disclosure. FIG. 4D illustrates switching control of a DC/DC converter through an added technique while an input voltage $V_{in}$ of a DC/DC converter 100 is greater than, equal to, or less than twice ($2V_{o\_REF}$) an output reference voltage ($V_{o\_REF}$) according to an embodiment of the disclosure.

Referring to FIGS. 4A, 4B, 4C, 4D, the output reference voltage $V_{o\_REF}$ may indicate a reference voltage required at the output terminal of the DC/DC converter 100, and may be described as a first threshold voltage in the drawings to be described later.

Referring to FIG. 4A, in the S1_RD state (e.g., Q1(off), Q2(on), Q3(on), and Q4(off) states in FIG. 1), when the output voltage $V_o$ is decreased less than the output reference voltage $V_{o\_REF}$ at time point $t_1$, the DC/DC converter 100 may enter the S1_RES state (e.g., Q1(on), Q2(off), Q3(on), and Q4(off) in FIG. 1). At time point $t_2$, when the voltage $V_{cfly}$ of the first capacitor 103 is to be equal to the input voltage $V_{in}$ (e.g., if a switch node voltage ($V_x$) (e.g., $V_{in}-V_{cfly}$) is decreased to a second threshold voltage (e.g., 0 V) or less before the inductor current $I_L$ decreases to the second threshold current (e.g., 0 A) or less), the DC/DC converter 100 may enter the S1_LF state (e.g., Q2(off), Q3(on), and Q4(on) states in FIG. 1) from the S1_RES state. In the S1_LF state, the inductor current $I_L$ may decrease linearly. At time point $t_3$ (e.g., after the switch node voltage $V_x$ is decreased to a second threshold voltage (e.g., 0 V) or less), if the inductor current $I_L$ is decreased a second threshold current (e.g., 0 A) or less, the DC/DC converter 100 may enter the S2_RD state (e.g., Q1(on), Q2(off), Q3(off), and Q4(on) states in FIG. 1). If the output voltage $V_o$ is decreased less than the output reference voltage $V_{o\_REF}$ at time point $t_4$, the DC/DC converter 100 may enter the S2_RES state (e.g., Q1(off), Q2(on), Q3(off), and Q4(on) in FIG. 1) from the S2_RD state. If the voltage ($V_{cfly}$) of the first capacitor 103 is decreased to 0 V or less at time point is (e.g., if the switch node voltage $V_x$ (e.g., $V_{cfly}$) decreases to the second threshold voltage (e.g., 0 V) or less), the DC/DC converter 100 may enter the S2_LF state (e.g., Q1(off), Q3(on), and Q4(on) states in FIG. 1) from the S2_RES state. In the S2_LF state, the inductor current $I_L$ may decrease linearly. At time point $t_6$ (e.g., after the switch node voltage $V_x$ is decreased to a second threshold voltage (e.g., 0 V) or less, the inductor current $I_L$ is decreased to the second threshold current (e.g., 0 A) or less, the DC/DC converter 100 may enter the S1_RD state. Thereafter, similarly to the above-described conditions, switching operations after $t_6$ may be performed.

$I_o$ of FIG. 4A represents a current (e.g., a load current) required at a load terminal of the DC/DC converter 100. According to various embodiments of the disclosure, according to a load connected to the load terminal of the DC/DC converter 100, the length of period of the S1_RD state and/or S2_RD state described above may be changed. According to various embodiments of the disclosure, a current which the DC/DC converter 100 can supply to a load becomes the maximum current from the moment when the period of the Sx_RD state ends (e.g., from the time when a time point at which the inductor current $I_L$ is decreased to the second threshold current or less becomes the same as a time point at which output voltage $V_o$ is decreased less than the output reference voltage $V_{o\_REF}$), and in a case of FIG. 4A, the maximum suppliable current may be $I_{o2}$. If there is no Sx_LR state ($I_{L\_B}=0$ A), the output voltage $V_o$ may decrease under the condition (e.g., after time point $t_9$) of load current exceeding the maximum suppliable current $I_{o2}$.

Referring to FIG. 4B, the DC/DC converter 100 may enter the S1_RES state at time point $t_1$. For example, at time point $t_7$, when the inductor current $I_L$ is decreased to a second threshold current (e.g., 0 A) or less, the output voltage $V_o$ also is decreased less than the output reference voltage $V_{o\_REF}$, and thus the DC/DC converter 100 may enter the S2_RES state from the S1_RES state without entering the S1_LF state and/or the S2_RD state. Even at later time points, since the output voltage $V_o$ also is decreased less than the output reference voltage $V_{o\_REF}$ when the inductor current $I_L$ is decreased to the second threshold current (e.g., 0 A) or less, the DC/DC converter 100 may alternatively enter the S1_RES state and the S2_RES state without entering the Sx_LF state and/or Sx_RD state.

Referring to FIG. 4B, operation until time point $t_6$ may be the same as that of FIG. 4A describing a case in which the input voltage $V_{in}$ is greater than twice ($2V_{o\_REF}$) the output reference voltage, and thus the description thereof will be omitted. When the input voltage ($V_{IN}$) is equal to twice ($2V_{o\_REF}$) the output reference voltage at time point $t_6$, since a time point at which Sx_RES ends (e.g., a time point at which the voltage ($V_{Cfly}$) of the first capacitor 103 becomes equal to the input voltage ($V_{IN}$) or becomes 0 V) is the same as the time point at which the inductor current $I_L$ becomes 0 A, only Sx_RD or Sx_RES period may exist according to the load current $I_o$ under this condition. After time point $t_8$, the input voltage $V_{in}$ may be lowered to be less than twice the output reference voltage ($2V_{o\_REF}$). Here, since the difference (e.g., $V_{in}-V_o$) between the input voltage yin and the output voltage $V_o$ is smaller than the output voltage $V_o$ (or the output reference voltage $V_{o\_REF}$), the first capacitor 103 is not sufficiently charged and the voltage $V_{cfly}$ of the first capacitor 103 does not increase to the input voltage $V_{in}$, and thus it is impossible to supply a sufficient current (e.g., when the average value of the inductor current $I_L$ is smaller than the load current $I_o$). Accordingly, when the input voltage $V_{IN}$ is smaller than twice the output reference voltage ($2V_{o\_REF}$), if the DC/DC converter alternately enters the S1_RES state and the S2_RES state, the maximum suppliable current may be lowered less than $I_{o1}$.

Therefore, in the disclosure, if the inductor current $I_L$ is less than the first threshold current $I_{L\_B}$ before entering the Sx_RES state (e.g., resonant period), a method for entering the Sx_RES state after linearly increasing the inductor current $I_L$ is proposed and will be described below with reference to the drawings to be described later.

$I_o$ of FIG. 4C represents a current (e.g., a load current) required at the load terminal of the DC/DC converter 100. When comparing to the case of FIG. 4A, FIG. 4C shows a case in which the output voltage $V_o$ at time point $t_4$ is lower than the output reference voltage $V_{o\_REF}$ (e.g., similar to time point $t_{12}$ of FIG. 4A). However, unlike FIG. 4A, referring to FIG. 4C, the first threshold current $I_{L\_B}$ is increased at time point $t_4$, and thus an S1_LR period is added between $t_4$ to $t_5$. The S1_LR period may be terminated at time point $t_5$ when the inductor current $I_L$ becomes higher than the first threshold current $I_{L\_B}$, and may be converted to the S1_RES state. When the output voltage $V_o$ at time point $t_7$ is higher than the output reference voltage $V_{o\_REF}$, the DC/DC converter 100 lowers the first threshold current $I_{L\_B}$ again, and when the output voltage $V_o$ at time point $t_7$ is lowered than the output reference voltage ($V_{o\_REF}$), the DC/DC converter 100 may operate in the S2_LR state and may maintain the state until the inductor current $I_L$ becomes to be the first threshold current $I_{L\_B}$. The DC/DC converter 100 may maintain the output voltage $V_o$ as the output reference voltage $V_{o\_REF}$ even if the load current increases through the process of increasing or decreasing the Sx_LR period.

When comparing FIG. 4D with FIG. 4B, FIG. 4B shows a case in which the output voltage $V_o$ is lower than the output reference voltage $V_{o\_REF}$ at time point $t_4$ (e.g., similar to time point $t_9$ of FIG. 4B). However, unlike FIG. 4B, referring to FIG. 4D, the first threshold current $I_{L\_B}$ is increased at time point $t_4$, and thus the S1_LR period is added between $t_4$ to $t_5$. The S1_LR period may be terminated at time point $t_5$ when the inductor current $I_L$ becomes higher than the first threshold current $I_{L\_B}$, and may be converted to the S1_RES state. When the output voltage $V_o$ is higher than the output reference voltage $V_{o\_REF}$ at time point $t_7$, the DC/DC converter 100 may lower the first threshold current $I_{L\_B}$ again, and when the output voltage $V_o$ becomes lower than the output reference voltage ($V_{o\_REF}$) at time point $t_8$, the DC/DC converter 100 operates in the S2_LR state and may maintain the state until the inductor current $I_L$ becomes the first threshold current $I_{L\_B}$. The DC/DC converter 100 may maintain the output voltage $V_o$ as the output reference voltage $V_{o\_REF}$ even when the input voltage $V_{in}$ varies through a process of increasing or decreasing the Sx_LR period.

Figure 5:
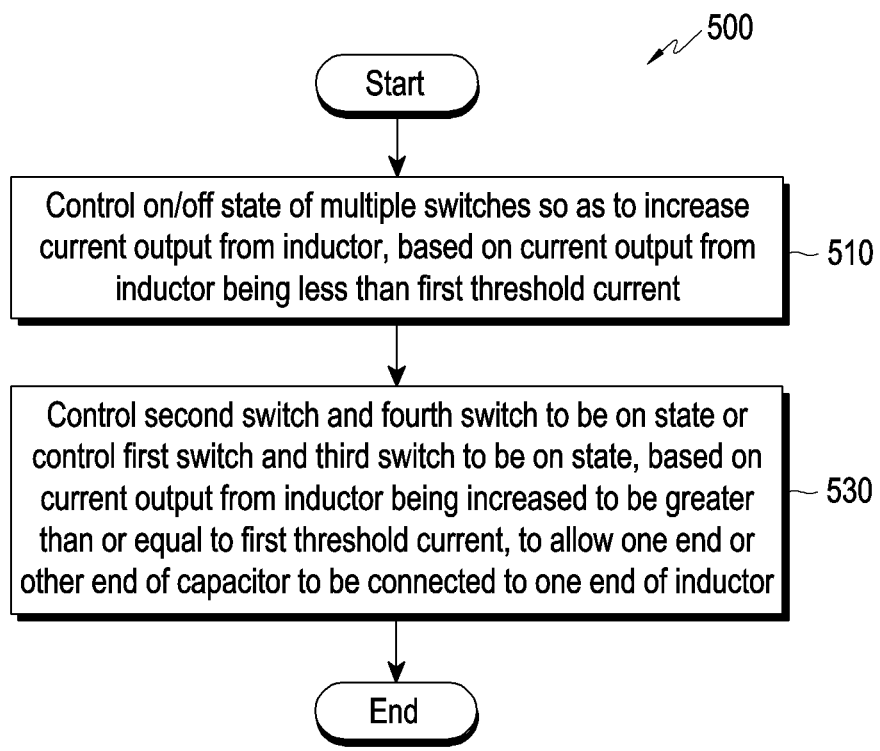
FIG. 5 is a flowchart illustrating a method in which a DC/DC converter controls an on/off state of multiple switches based on a magnitude of an inductor current according to an embodiment of the disclosure.

FIG. 5 is a flowchart 500 illustrating a method in which a DC/DC converter controls an on/off state of multiple switches based on a magnitude of an inductor current $I_L$ according to an embodiment of the disclosure. Hereinafter, operations of the DC/DC converter 100 will be described with reference to FIG. 1.

Referring to FIG. 5, according to various embodiments of the disclosure, in operation 510, the DC/DC converter 100 may control the on/off state of the multiple switches 101 so as to increase the current $I_L$ output from the first inductor 105, based on the current $I_L$, which is output from the first inductor 105, being less than the first threshold current $I_{L\_B}$. For example, the initial value of the first threshold current $I_{L\_B}$ may be preconfigured to be 0 A. For example, in the Sx_RD state (e.g., the S1_RD state or the S2_RD state) (or before entering the Sx_RES state), the DC/DC converter 100 may control the on/off state of the multiple switches 101 to correspond to the Sx_LR state (e.g., the S1_LR state or the S2_LR state) when the inductor current $I_L$ is less than the first threshold current $I_{L\_B}$. More specifically, in the S1_RD state (or before entering the S1_RES state), if the inductor current $I_L$ is less than the first threshold current $I_{L\_B}$, the DC/DC converter 100 may control the first switch 101a and the second switch 101b to be on state, and may control the fourth switch 101d to be off state (e.g., the DC/DC converter may enter the S1_LR state). In the S2_RD state (or before entering the S2_RES state), if the inductor current $I_L$ is less than the first threshold current $I_{L\_B}$, the DC/DC converter 100 may control the first switch 101a and the second switch 101b to be on state and may control the third switch 101c to be off state (e.g., the DC/DC converter may enter the S2_LR state). According to various embodiments of the disclosure, based on the control of the multiple switches 101 described above, the inductor current $I_L$ may increase linearly. According to various embodiments of the disclosure, the DC/DC converter 100 may maintain the Sx_LR state until the inductor current $I_L$ increases to be greater than or equal to the first threshold current $I_{L\_B}$. According to an embodiment of the disclosure, in the Sx_RD state (e.g., the S1_RD state or the S2_RD state) (or before entering the Sx_RES state), if the inductor current $I_L$ is less than the first threshold current $I_{L\_B}$, the DC/DC converter 100 may maintain the Sx_LR state (e.g., S1_LR state or S2_LR state) for a preset period of time.

According to various embodiments of the disclosure, in operation 530, the DC/DC converter 100 may control, based on the current $I_L$, which is output from the first inductor 105, being increased to be greater than or equal to the first threshold current $I_{L\_B}$, the second switch 101b and the fourth switch 101d to be on state or control the first switch 101a and the third switch 101c to be on state to allow one end or the other end of a capacitor (e.g., the first capacitor 103) to be connected to one end of the first inductor 105. For example, when the inductor current $I_L$ linearly increases in the S1_LR state to be equal to or greater than the first threshold current $I_{L\_B}$, the DC/DC converter 100 may control the first switch 101a and the third switch 101c to be on state to connect the capacitor (e.g., the first capacitor 103) and the first inductor 105 in series (e.g., the S1_RES state). Here, the second switch 101b and the fourth switch 101d may be controlled to be off state. For example, when the inductor current $I_L$ linearly increases in the S2_LR state to be equal to or greater than the first threshold current $I_{L\_B}$, the DC/DC converter 100 may control the second switch 101b and the fourth switch 101d to be on state to connect the capacitor (e.g., the first capacitor 103) and the first inductor 105 in series (e.g., the S2_RES state). Here, the first switch 101a and the third switch 101c may be controlled to be off.

Figure 6:
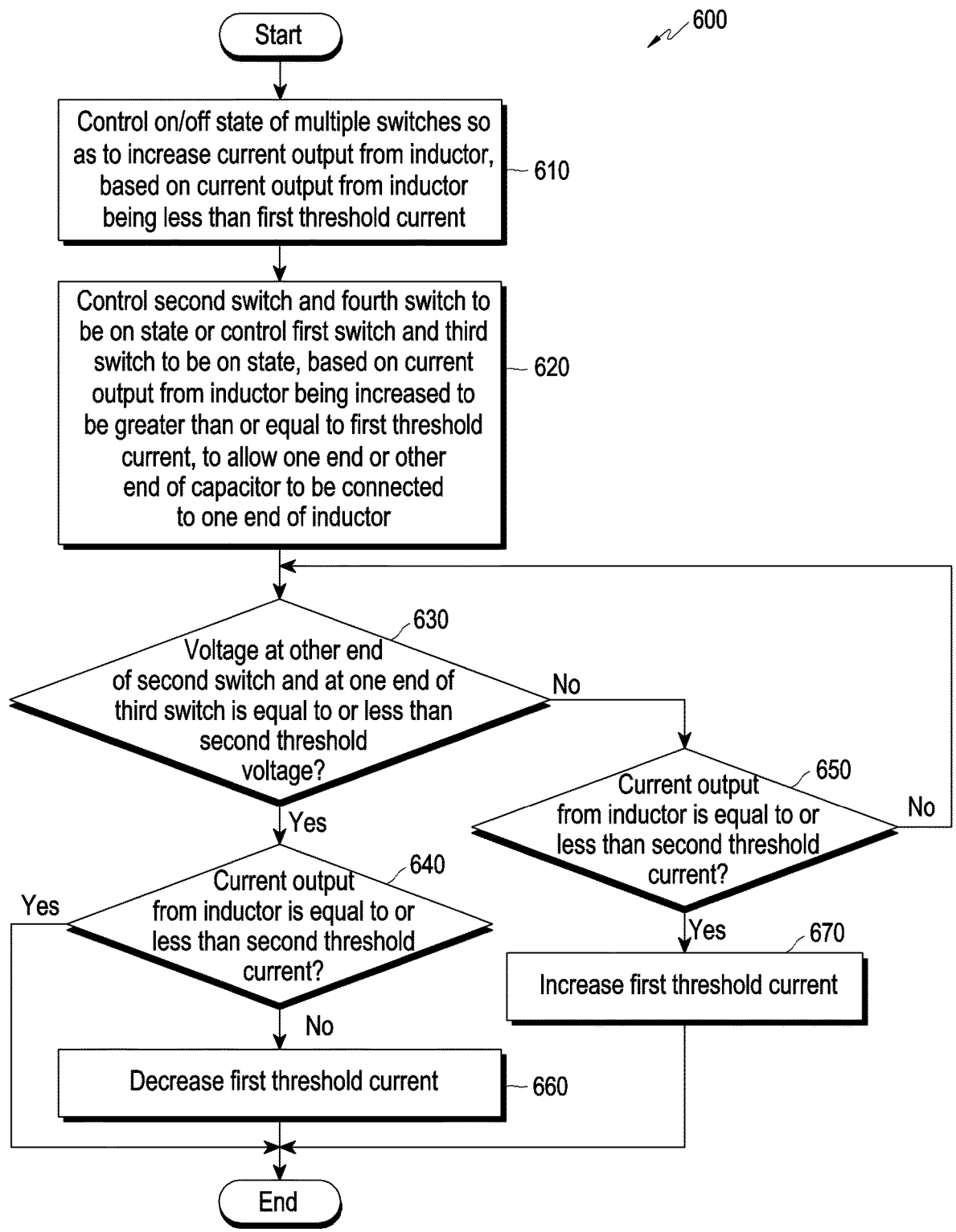
FIG. 6 is a flowchart illustrating a method in which a DC/DC converter changes a first threshold current according to an embodiment of the disclosure.

FIG. 6 is a flowchart 600 illustrating a method in which a DC/DC converter changes a first threshold current $I_{L\_B}$ according to an embodiment of the disclosure. Hereinafter, operations of the DC/DC converter 100 will be described with reference to FIG. 1.

Referring to FIG. 6, according to various embodiments of the disclosure, in operation 610, the DC/DC converter 100 may control the on/off state of the multiple switches 101 so as to increase the output current $I_L$, based on the current $I_L$, which is output from the first inductor 105, being less than the first threshold current $I_{L\_B}$. For example, the DC/DC converter 100 may be in an Sx_LR state.

According to various embodiments of the disclosure, in operation 620, the DC/DC converter 100 may control, based on the current $I_L$, which is output from the first inductor 105, being increased to be greater than or equal to the first threshold current $I_{L\_B}$, the second switch 101b and the fourth switch 101d to be on state or control the first switch 101a and the third switch 101c to be on state to allow one end or the other end of a capacitor (e.g., the first capacitor 103) to be connected to one end of the first inductor 105. For example, the DC/DC converter 100 may be in an Sx_RES state.

According to various embodiments of the disclosure, when the voltage (e.g., switch node voltage $V_x$) at the other end of the second switch 101b and at one end of the third switch 101c is equal to or less than a second threshold voltage (e.g., 0 V) (e.g., "Yes" in operation 630), if the current $I_L$ output from the first inductor 105 is greater than the second threshold current (e.g., 0 A) (e.g., "No" in operation 640), the DC/DC converter 100 may decrease the first threshold current ($I_{L\_B}$) in operation 660. More specifically, when the switch node voltage $V_x$ is decreased to a second threshold voltage (e.g., 0 V) or less in the Sx_RES state, if the inductor current $I_L$ is not decreased to the second threshold voltage (e.g., 0 A) or less (or if the switch node voltage ($V_x$) is decreased to a second threshold voltage (e.g., 0 V) or less, and then the inductor current $I_L$ is decreased to the second threshold current or less), the DC/DC converter 100 may decrease the first threshold current $I_{L\_B}$. According to various embodiments of the disclosure, based on the decrease of the first threshold current $I_{L\_B}$, the length of period of the Sx_LR state (e.g., the time during which the Sx_LR state is maintained after entering the Sx_LR state) may decrease. According to an embodiment of the disclosure, the DC/DC converter 100 may reduce the length of period of the Sx_LR state without using the first threshold current $I_{L\_B}$ when controlling the on/off state of the multiple switches 101. For example, the DC/DC converter 100 may adjust the length of period of the Sx_LR state to a preset time shorter than the length of period of the previous Sx_LR state. According to an embodiment of the disclosure, the DC/DC converter 100 may enter the Sx_LF state (e.g., control the multiple switches 101 to be on/off state corresponding to the S1_LF state or the S2_LF state) after performing operation 660, and may decrease the inductor current $I_L$ linearly.

According to various embodiments of the disclosure, when the voltage (e.g., switch node voltage $V_x$) at the other end of the second switch 101b and at one end of the third switch 101c is equal to or less than a second threshold voltage (e.g., 0 V) (e.g., "Yes" in operation 630), if the current $I_L$ output from the first inductor 105 is equal to or less than the second threshold current (e.g., 0 A) (e.g., "Yes" in operation 640), the DC/DC converter 100 may maintain the first threshold current ($I_{L\_B}$). According to various embodiments of the disclosure, when the voltage (e.g., switch node voltage $V_x$) at the other end of the second switch 101b and at one end of the third switch 101c is equal to or less than a second threshold voltage (e.g., 0 V) (e.g., "Yes" in operation 630) and the current $I_L$ output from the first inductor 105 is equal to or less than the second threshold current (e.g., 0 A) (e.g., "Yes" in operation 640), if the output voltage $V_o$ is decreased less than the first threshold voltage $V_{o\_REF}$, the DC/DC converter 100 may increase the first threshold current $I_{L\_B}$ (e.g., operation 670). According to various embodiments of the disclosure, when the voltage (e.g., switch node voltage $V_x$) at the other end of the second switch 101b and at one end of the third switch 101c is equal to or less than a second threshold voltage (e.g., 0 V) (e.g., "Yes" in operation 630) and the current $I_L$ output from the first inductor 105 is equal to or less than the second threshold current (e.g., 0 A) (e.g., "Yes" in operation 640), if the output voltage $V_o$ does not decrease below the first threshold voltage $V_{o\_REF}$, the DC/DC converter 100 may maintain the first threshold current $I_{L\_B}$.

According to various embodiments of the disclosure, when the voltage (e.g., switch node voltage $V_x$) at the other end of the second switch 101b and at one end of the third switch 101c is greater than a second threshold voltage (e.g., 0 V) (e.g., "No" in operation 630), if the current $I_L$ output from the first inductor 105 is equal to or less than the second threshold current (e.g., 0 A) (e.g., "Yes" in operation 650), the DC/DC converter 100 may increase the first threshold current ($I_{L\_B}$) in operation 670. More specifically, if the inductor current $I_L$ is decreased to a second threshold voltage (e.g., 0 A) or less before the switch node voltage $V_x$ decreases to the second threshold voltage (e.g., 0 V) or less in the Sx_RES state, the DC/DC converter 100 may increase the first threshold current $I_{L\_B}$. According to various embodiments of the disclosure, the DC/DC converter 100 may increase the length of period of the Sx_LR state without using the first threshold current $I_{L\_B}$ when controlling the on/off states of the multiple switches 101. For example, the DC/DC converter 100 may adjust the length of period of the Sx_LR state to a preset time longer than the length of period of the previous Sx_LR state. According to an embodiment of the disclosure, after performing operation 670, the DC/DC converter 100 may enter the Sx_RD state (e.g., control the multiple switches 101 to be on/off state corresponding to the S1_RD state or the S2_RD state), based on the fact that the switch node voltage $V_x$ is equal to or less than a second threshold voltage (e.g., 0 V) and the inductor current $I_L$ is equal to or less than a second threshold current (e.g., 0 A). More particularly, the DC/DC converter 100 may enter the S2_RD state after operations 630, 650, and 670 in the S1_RES state (e.g., the multiple switches 101 are controlled to be on/off state corresponding to the S2_RD state). Alternatively, the DC/DC converter 100 may enter the S1_RD state after operations 630, 650, and 670 in the S2_RES state (e.g., the multiple switches 101 are controlled to be on/off state corresponding to the S1_RD state).

According to various embodiments of the disclosure, when the voltage (e.g., switch node voltage $V_x$) at the other end of the second switch 101b and at one end of the third switch 101c is greater than a second threshold voltage (e.g., 0 V) (e.g., "No" in operation 630), if the current $I_L$ output from the first inductor 105 is greater than the second threshold current (e.g., 0 A) (e.g., "No" in operation 650), the DC/DC converter 100 may perform operations according to operation 630.

Figure 7A:
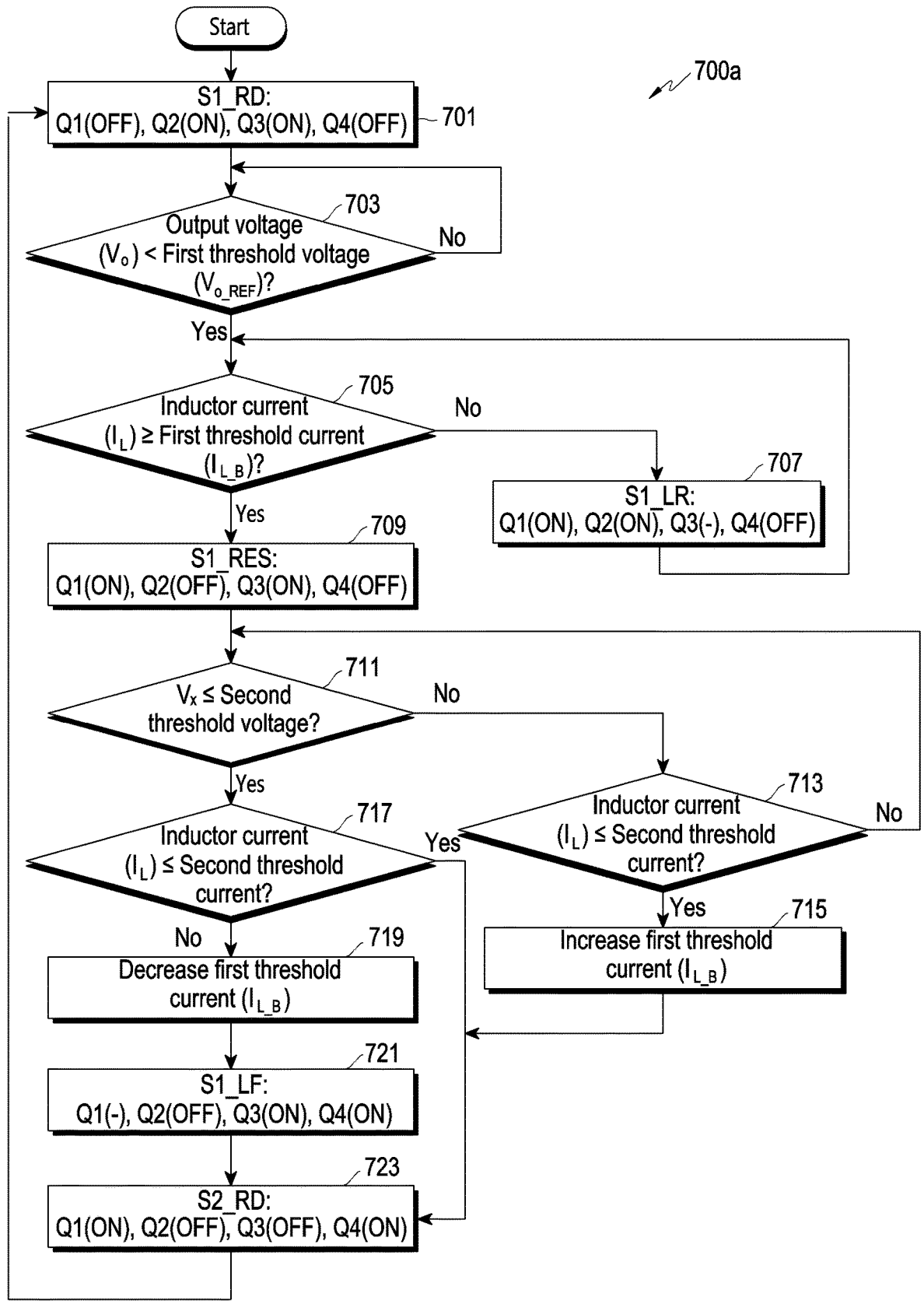
FIG. 7A is a flowchart illustrating a method in which a DC/DC converter controls an on/off state of multiple switches in an S1 state according to an embodiment of the disclosure.
Figure 7B:
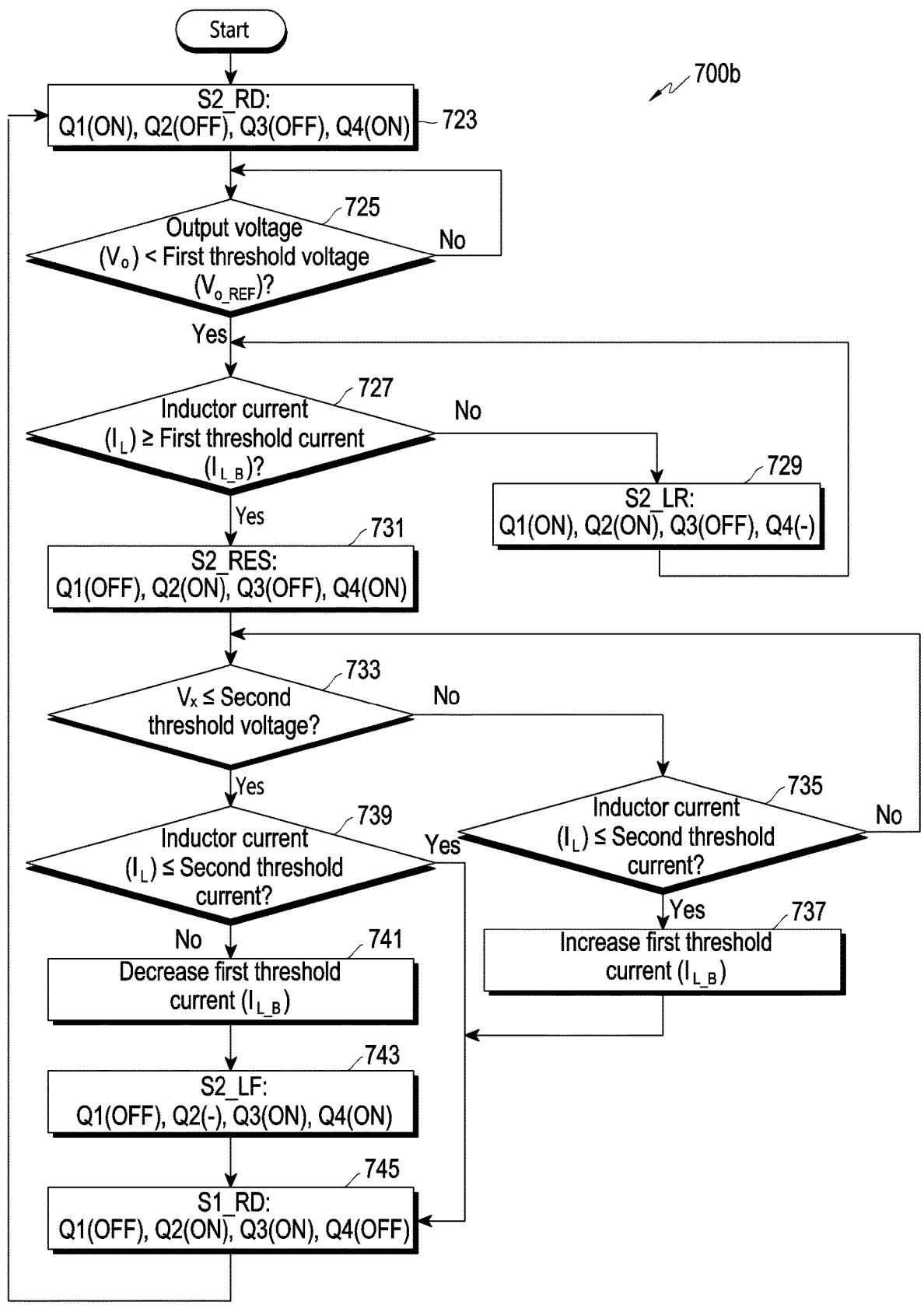
FIG. 7B is a flowchart illustrating a method in which a DC/DC converter controls an on/off state of multiple switches in an S2 state according to an embodiment of the disclosure.

FIG. 7A is a flowchart 700a illustrating a method in which a DC/DC converter controls an on/off state of multiple switches in an S1 state according to an embodiment of the disclosure. FIG. 7B is a flowchart 700b illustrating a method in which a DC/DC converter controls an on/off state of multiple switches 101 in an S2 state according to an embodiment of the disclosure.

Referring to FIG. 7A, according to various embodiments of the disclosure, in operation 701, the DC/DC converter 100 may control the on/off state of the multiple switches 101 to correspond to the S1_RD state (e.g., Q1(off), Q2(on), Q3(on) and Q4(off)).

According to various embodiments of the disclosure, the DC/DC converter 100 may maintain the on/off state of the multiple switches 101 to correspond to the S1_RD state when the output voltage $V_o$ is equal to or greater than the first threshold voltage $V_{o\_REF}$ (e.g., "No" in operation 703).

According to various embodiments of the disclosure, when the output voltage $V_o$ is less than the first threshold voltage $V_{o\_REF}$ (e.g., "Yes" in operation 703), if the inductor current $I_L$ is less than the first threshold current $I_{L\_B}$ (e.g., "No" in operation 705), the DC/DC converter 100 may control the on/off state of the multiple switches 101 to correspond to the S1_LR state (e.g., Q1(on), Q2(on), Q3(-), and Q4(off)) in operation 707.

According to various embodiments of the disclosure, when operation 703 is determined to be "Yes" or after operation 707, if the inductor current $I_L$ is equal to or greater than the first threshold current $I_{L\_B}$ (e.g., "Yes" in operation 705), the DC/DC converter 100 may control the on/off state of the multiple switches 101 to correspond to the S1_RES state (e.g., Q1(on), Q2(off), Q3(on), and Q4(off)) in operation 709.

According to various embodiments of the disclosure, after operation 709, when the switch node voltage $V_x$ (e.g., $V_{in}-V_{cfly}$) is greater than a second threshold voltage (e.g., 0 V) (e.g., when $V_{cfly}$ is not increased to $V_{in}$ or more (e.g., "No" in operation 711), if the inductor current $I_L$ is equal to or less than a second threshold current (e.g., 0 A) (e.g., "Yes" in operation 713), the DC/DC converter 100 may increase the first threshold current $I_{L\_B}$ in operation 715. For example, if the inductor current $I_L$ is equal to or less than a second threshold current (e.g., 0 A) before $V_{cfly}$ is increased to $V_{in}$ or more, the length of period of the S1_LR state may be shorter than a time required to supply sufficient current in the next period S2_XX. The DC/DC converter 100 may increase the first threshold current $I_{L\_B}$ in order to increase the length of the period in the S1_LR state.

According to various embodiments of the disclosure, after operation 715, the DC/DC converter 100 may perform operation 723. For example, based on the fact that the switch node voltage $V_x$ is decreased to the second threshold voltage (e.g., 0 V) or less and the inductor current $I_L$ is decreased to a second threshold current (e.g., 0 A) or less, the DC/DC converter 100 may control the on/off state of the multiple switches 101 to correspond to the S2_RD state (e.g., Q1(on), Q2 (off), Q3 (off)) and Q4(on)) in operation 723.

According to various embodiments of the disclosure, after operation 709, when the switch node voltage $V_x$ (e.g., $V_{in}-V_{cfly}$) is greater than the second threshold voltage (e.g., 0 V) (e.g., when $V_{cfly}$ is not increased to $V_{in}$ or more) (e.g., "No" in operation 711), if the inductor current $I_L$ is greater than a second threshold current (e.g., 0 A) (e.g., "No" in operation 713), the DC/DC converter 100 may perform operations according to operation 711.

According to various embodiments of the disclosure, after operation 709, when the switch node voltage $V_x$ (e.g., $V_{in}-V_{cfly}$) is equal to or less than the second threshold voltage (e.g., 0 V) (e.g., "Yes" in operation 711), if the inductor current $I_L$ is greater than the second threshold current (e.g., 0 A) (e.g., "No" in operation 717) (e.g., if $V_{cfly}$ is increased to yin or more and then if the inductor current $I_L$ is decreased to a second threshold current or less), the DC/DC converter 100 may decrease the first threshold current $I_{L\_B}$ in operation 719. For example, if the inductor current $I_L$ is not decreased to the second threshold current (e.g., 0 A) or less when $V_{cfly}$ is increased to $V_{in}$ or more, the length of period of the S1_LR state may be longer than a time required to supply sufficient current in the next period S2_XX. The DC/DC converter 100 may decrease the first threshold current $I_{L\_B}$ in order to adjust the length of period of the S1_LR state. According to an embodiment of the disclosure, when the switch node voltage $V_x$ (e.g., $V_{in}-V_{cfly}$) is equal to or less than the second threshold voltage (e.g., 0 V) (e.g., "Yes" in operation 711) and the inductor current $I_L$ is equal to or less than the second threshold current (e.g., 0 A) (e.g., "Yes" in operation 717), if the output voltage $V_o$ is decreased to $V_{o\_REF}$ or less, the DC/DC converter 100 may increase the first threshold current $I_{L\_B}$ (e.g., operation 715). According to an embodiment of the disclosure, when the switch node voltage $V_x$ (e.g., $V_{in}-V_{cfly}$) is equal to or less than the second threshold voltage (e.g., 0 V) (e.g., "Yes" in operation 711) and the inductor current $I_L$ is equal to or less than the second threshold current (e.g., 0 A) (e.g., "Yes" in operation 717), if the output voltage $V_o$ is not decreased to $V_{o\_REF}$ or less, the DC/DC converter 100 may maintain the first threshold current $I_{L\_B}$.

According to various embodiments of the disclosure, after operation 719, the DC/DC converter 100 may control the on/off state of the multiple switches 101 to correspond to the S1_LF state (e.g., Q1(-)), Q2(off), Q3(on) and Q4(on)) in operation 721. In the S1_LF state, the inductor current $I_L$ may decrease linearly.

According to various embodiments of the disclosure, after operation 721, the DC/DC converter 100 may perform operation 723. For example, based on the inductor current $I_L$ being decreased to the second threshold current (e.g., 0 A) or less in a state in which the switch node voltage $V_x$ is equal to or less than the second threshold voltage (e.g., 0 V), the DC/DC converter 100 may control the on/off state of the multiple switches 101 to correspond to the S2_RD state (e.g., Q1(on), Q2(off), Q3(off), and Q4(on)) in operation 723.

Referring to FIG. 7B, according to various embodiments of the disclosure, when the output voltage $V_o$ is equal to or greater than the first threshold voltage $V_{o\_REF}$ (e.g., "No" in operation 725), the DC/DC converter 100 may maintain the on/off state of multiple switches 101 to correspond to the S2_RD state.

According to various embodiments of the disclosure, when the output voltage $V_o$ is less than the first threshold voltage $V_{o\_REF}$ (e.g., "Yes" in operation 725), if the inductor current $I_L$ is less than the first threshold current $I_{L\_B}$ (e.g., "No" in operation 727), the DC/DC converter 100 may control the on/off state of the multiple switches 101 to correspond to the S2_LR state (e.g., Q1(on), Q2(on), Q3(-), and Q4(off)) in operation 729.

According to various embodiments of the disclosure, when operation 725 is determined to be "Yes" or after operation 729, if the inductor current $I_L$ is equal to or greater than the first threshold current $I_{L\_B}$ (e.g., "Yes" in operation 727), the DC/DC converter 100 may control the on/off state of the multiple switches 101 to correspond to the S2_RES state (e.g., Q1(on), Q2(off), Q3(on), and Q4(off)) in operation 731.

According to various embodiments of the disclosure, after operation 731, when the switch node voltage $V_x$ (e.g., $V_{cfly}$) is greater than a second threshold voltage (e.g., 0 V) (e.g., when $V_{cfly}$ is not decreased to second threshold voltage (e.g., 0 V) or less (e.g., "No" in operation 733), if the inductor current $I_L$ is equal to or less than the second threshold current (e.g., 0 A) (e.g., "Yes" in operation 735), the DC/DC converter 100 may increase the first threshold current $I_{L\_B}$ in operation 737. For example, if the inductor current $I_L$ is equal to or less than a second threshold current (e.g., 0 A) before $V_{cfly}$ decreases to the second threshold voltage (e.g., 0 V) or less, the length of period of the S2_LR state may be shorter than a time required to supply sufficient current in the next period S1_XX. The DC/DC converter 100 may increase the first threshold current $I_{L\_B}$ in order to increase the length of period of the S2_LR state.

According to various embodiments of the disclosure, after operation 737, the DC/DC converter 100 may perform operation 745. For example, based on the fact that the switch node voltage $V_x$ is decreased to the second threshold voltage (e.g., 0 V) or less and the inductor current $I_L$ is decreased to a second threshold current (e.g., 0 A) or less, the DC/DC converter 100 may control the on/off state of the multiple switches 101 to correspond to the S1_RD state (e.g., Q1(on), Q2 (off), Q3 (off)) and Q4(on)).

According to various embodiments of the disclosure, after operation 731, when the switch node voltage $V_x$ (e.g., $V_{cfly}$) is greater than the second threshold voltage (e.g., 0 V) (e.g., when $V_{cfly}$ is not decreased to 0 V or less) (e.g., "No" in operation 733), if the inductor current $I_L$ is greater than the second threshold current (e.g., 0 A), the DC/DC converter 100 may perform operations according to operation 733.

According to various embodiments of the disclosure, after operation 731, when the switch node voltage $V_x$ (e.g., $V_{cfly}$) is equal to or less than the second threshold voltage (e.g., 0 V) (e.g., after $V_{cfly}$ is decreased to a second threshold voltage (e.g., 0 V) or less) (e.g., "Yes" in operation 733), if the inductor current $I_L$ is greater than the second threshold current (e.g., 0 A) (e.g., "No" in operation 739), the DC/DC converter 100 may decrease the first threshold current $I_{L\_B}$ in operation 741. For example, if the inductor current $I_L$ is not decreased to the second threshold current (e.g., 0 A) or less when $V_{cfly}$ is decreased to the second threshold voltage (e.g., 0 V) or less, the length of period of the S2_LR state may be longer than a time required to supply sufficient current in the next period S1_XX. The DC/DC converter 100 may decrease the first threshold current $I_{L\_B}$ in order to adjust the length of period of the S2_LR state. According to an embodiment of the disclosure, when the switch node voltage $V_x$ (e.g., $V_{cfly}$) is equal to or less than the second threshold voltage (e.g., 0 V) (e.g., "Yes" in operation 733) and the inductor current $I_L$ is equal to or less than the second threshold current (e.g., 0 A) (e.g., "Yes" in operation 739), if the output voltage $V_o$ is decreased less than the first threshold voltage $V_{o\_REF}$, the DC/DC converter 100 may increase the first threshold current $I_{L\_B}$ (e.g., operation 737). According to an embodiment of the disclosure, when the switch node voltage $V_x$ (e.g., $V_{cfly}$) is equal to or less than the second threshold voltage (e.g., 0 V) (e.g., "Yes" in operation 733) and the inductor current $I_L$ is equal to or less than the second threshold current (e.g., 0 A) (e.g., "Yes" in operation 739), if the output voltage $V_o$ is not decreased to the first threshold voltage $V_{o\_REF}$ or less, the DC/DC converter 100 may maintain the first threshold current $I_{L\_B}$.

According to various embodiments of the disclosure, after operation 741, the DC/DC converter 100 may control the on/off state of the multiple switches 101 to correspond to the S1_LF state (e.g., Q1(off), Q2(–), Q3(on) and Q4(on)) in operation 743. In the S2_LF state, the inductor current $I_L$ may decrease linearly.

According to various embodiments of the disclosure, after operation 743, the DC/DC converter 100 may perform operation 745 (e.g., operation 701). For example, based on the inductor current $I_L$ being decreased to the second threshold current (e.g., 0 A) or less in a state in which the switch node voltage $V_x$ is equal to or less than the second threshold voltage (e.g., 0 V), the DC/DC converter 100 may control the on/off state of the multiple switches 101 to correspond to the S1_RD state (e.g., Q1(off), Q2(on), Q3(on), and Q4(off)) in operation 745.

According to various embodiments of the disclosure, after operation 745, the DC/DC converter 100 may perform the operations of FIG. 7A (e.g., operation 703 and thereafter).

Figure 8:
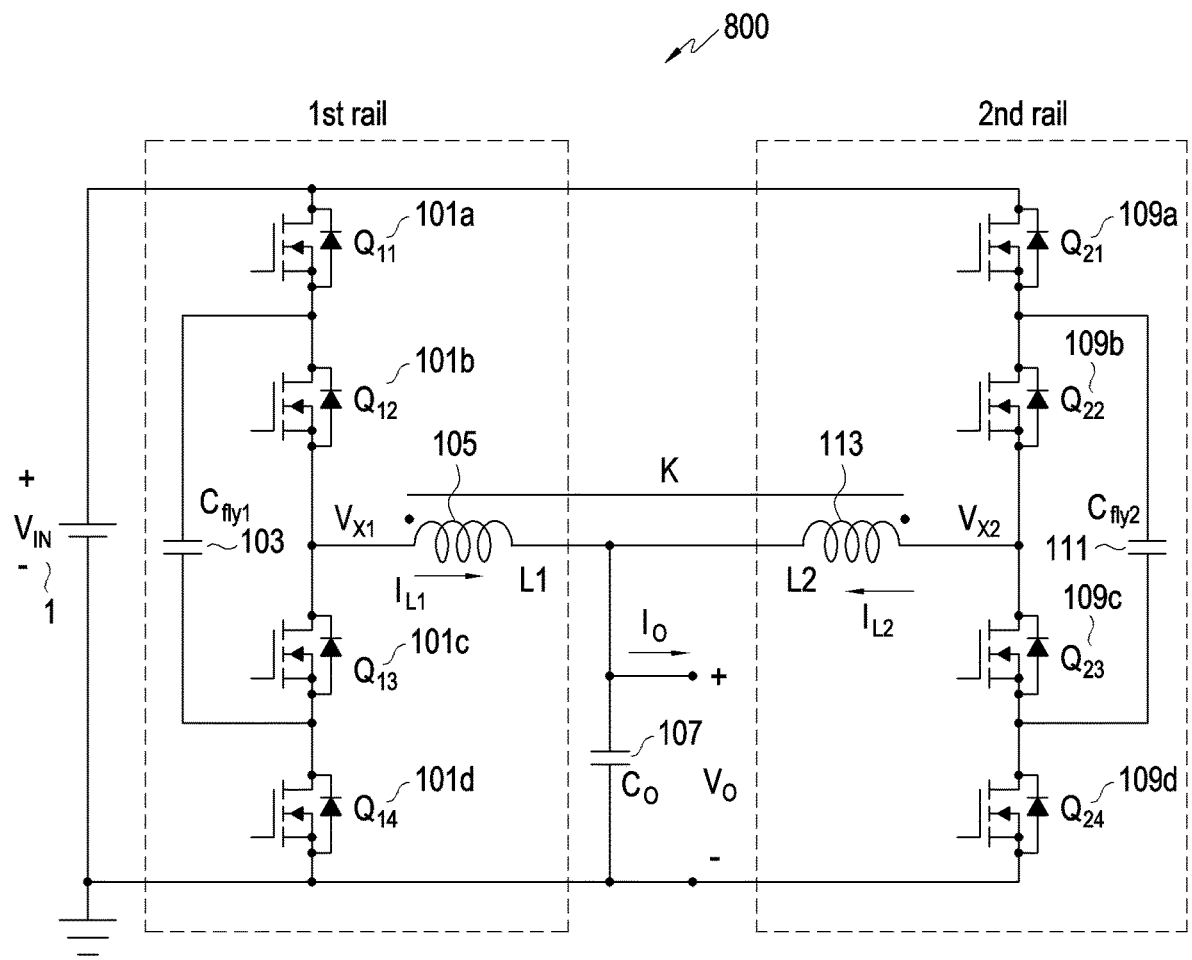
FIG. 8 illustrates elements of a DC/DC converter using an interleaving technology according to an embodiment of the disclosure.

FIG. 8 illustrates elements of a DC/DC converter 800 using an interleaving technology according to an embodiment of the disclosure.

Referring to FIG. 8, according to various embodiments of the disclosure, the DC/DC converter 800 may include multiple first switches 101, a first capacitor 103 (e.g., a flying capacitor), a first inductor 105, a second capacitor 107, multiple second switches 109, a third capacitor 111 (e.g., a flying capacitor), and/or a second inductor 113.

According to various embodiments of the disclosure, the first ($1^{st}$) rail of the DC/DC converter 800 may include multiple first switches 101, a first capacitor 103, and a first inductor 105, and the second ($2^{nd}$) rail of the DC/DC converter 800 may include multiple second switches 109, a third capacitor 111, and a second inductor 113.

According to various embodiments of the disclosure, the multiple first switches 101, the first capacitor 103, the first inductor 105, and the second capacitor 107 are the same as the elements described in FIG. 1, and thus description thereof will be omitted.

According to various embodiments of the disclosure, the multiple second switches 109 may include a fifth switch 109a (Q21), a sixth switch 109b (Q22), a seventh switch 109c (Q23), and/or an eighth switch 109d (Q24). According to various embodiments of the disclosure, each of the multiple second switches 109 may be implemented as a MOSFET or a diode.

According to various embodiments of the disclosure, each of the multiple second switches 109 may be controlled to be on state or off state under the control of a controller (not shown) (e.g., a gate driver or driving circuit). According to various embodiments of the disclosure, states of the $1^{st}$ rail may be defined according to the on/off state of the multiple first switches 101, and states of the $2^{nd}$ rail may be defined according to the on/off state of the multiple second switches 109. For example, the states of the $1^{st}$ rail and the states of the $2^{nd}$ rail may each include at least some of the states defined in Table 1.

According to various embodiments of the disclosure, a first inductor 105 ($L_1$) and a second inductor 113 ($L_2$) may be connected in series with each other. According to various embodiments of the disclosure, a coupling coefficient (K) between the first inductor 105 and the second inductor 113 may have a value between –1 to +1. For example, when the coupling coefficient K is greater than –1 and less than 0 or greater than 0 and less than +1, the first inductor 105 and the second inductor 113 may be referred to as coupled inductors. For example, if the coupling coefficient K is 0, the first inductor 105 and the second inductor 113 may be referred to as independent inductors. According to various embodiments of the disclosure, when the coupling coefficient K is less than 0, the interleaving technology of the disclosure may be applied to the DC/DC converter 800.

Figure 9A:
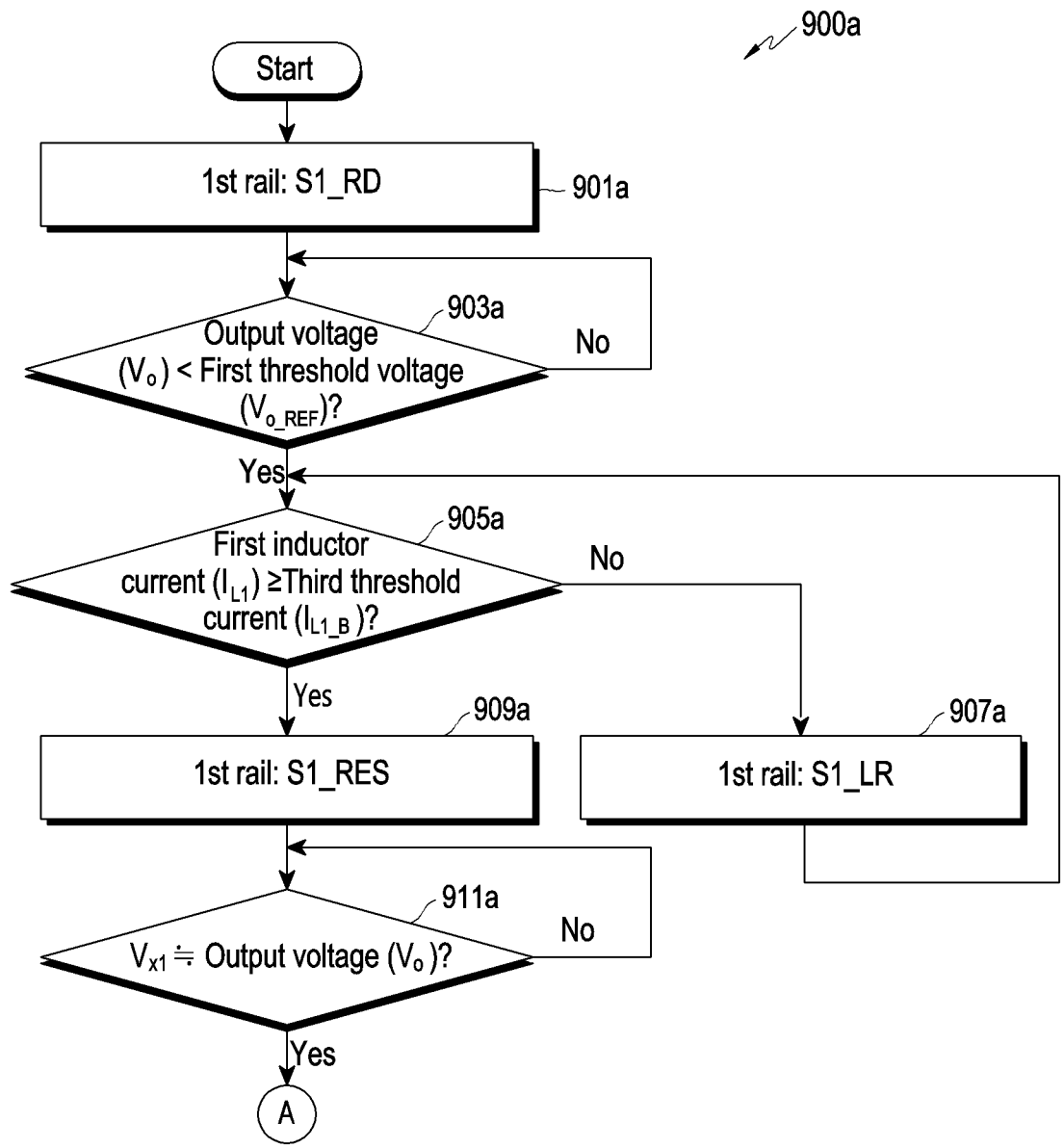
FIGS. 9A and 9B are flowcharts illustrating a method in which a DC/DC converter controls an on/off state of multiple first switches according to various embodiments of the disclosure.
Figure 9B:
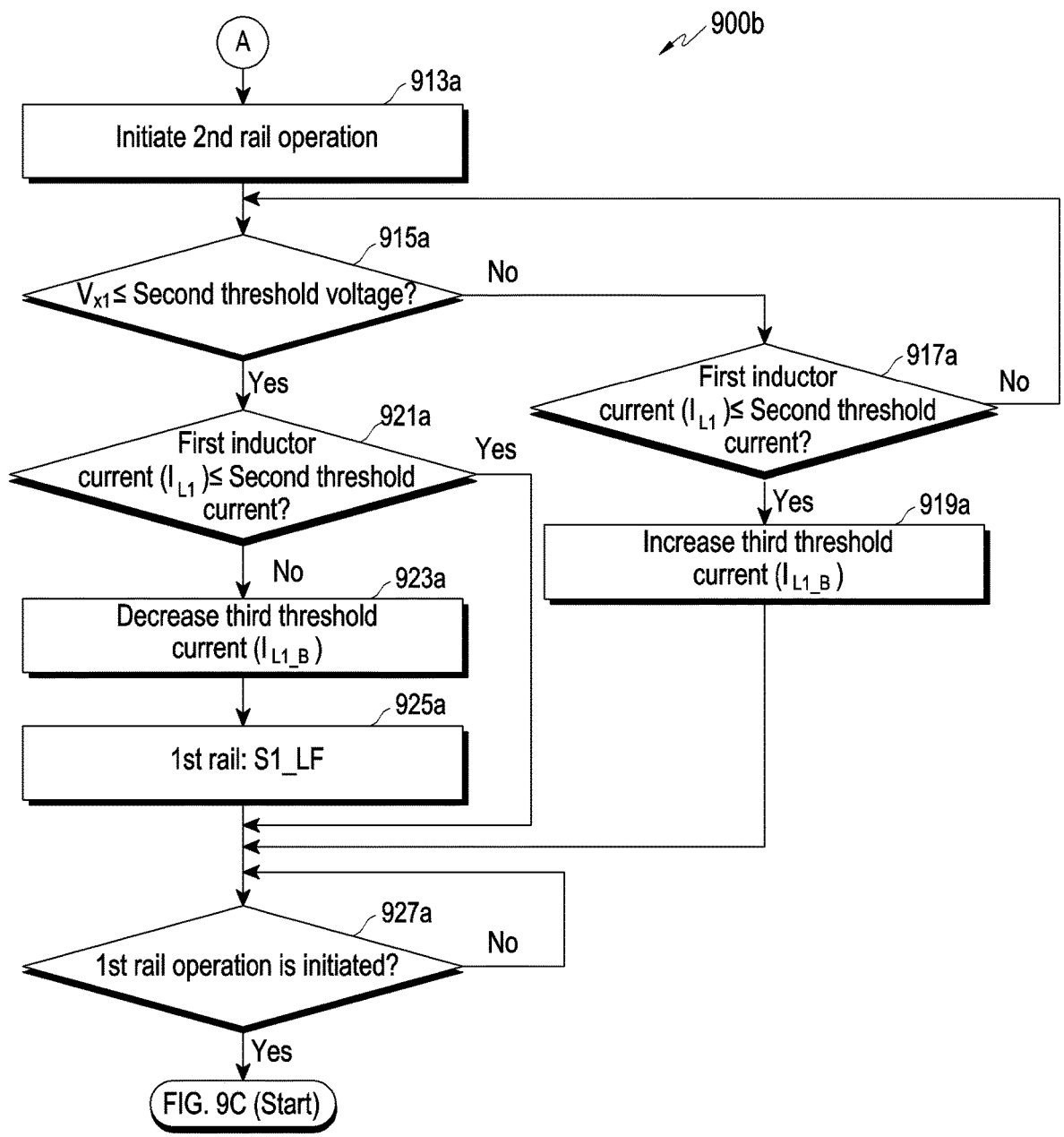
Figure 9C:
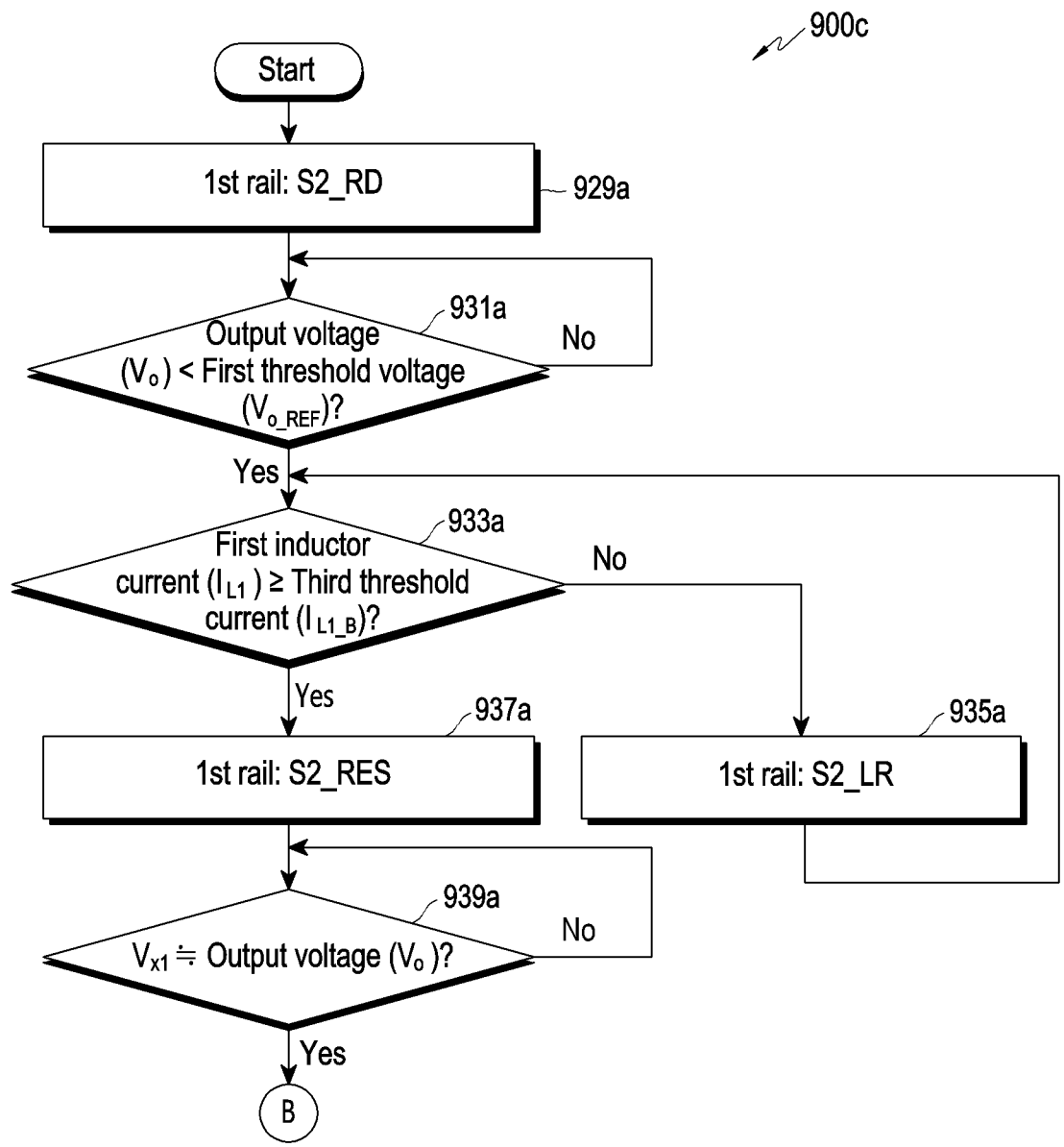
FIGS. 9C and 9D are flowcharts illustrating a method in which a DC/DC converter controls an on/off state of multiple first switches according to various embodiments of the disclosure.
Figure 9D:
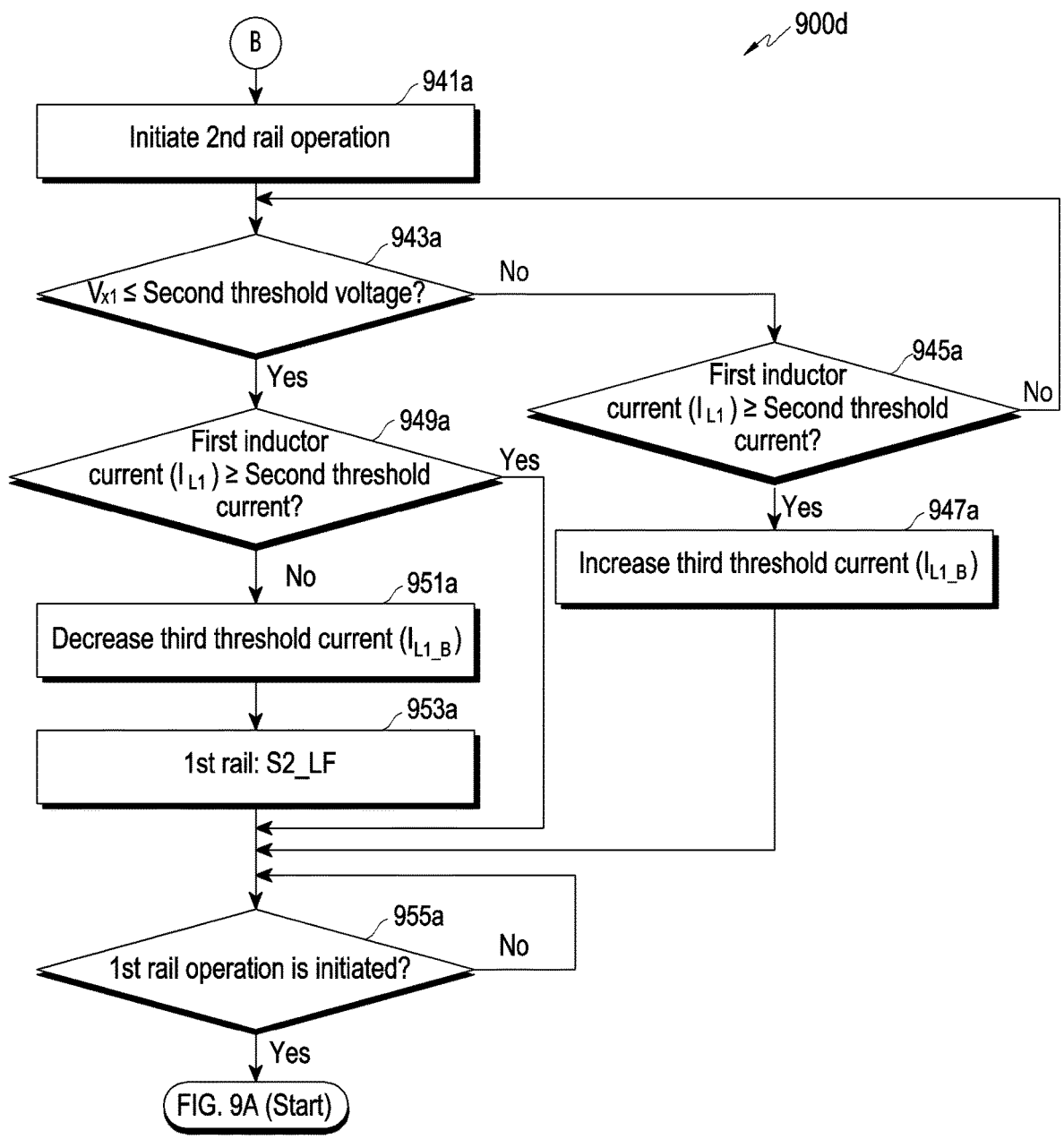
Figure 9E:
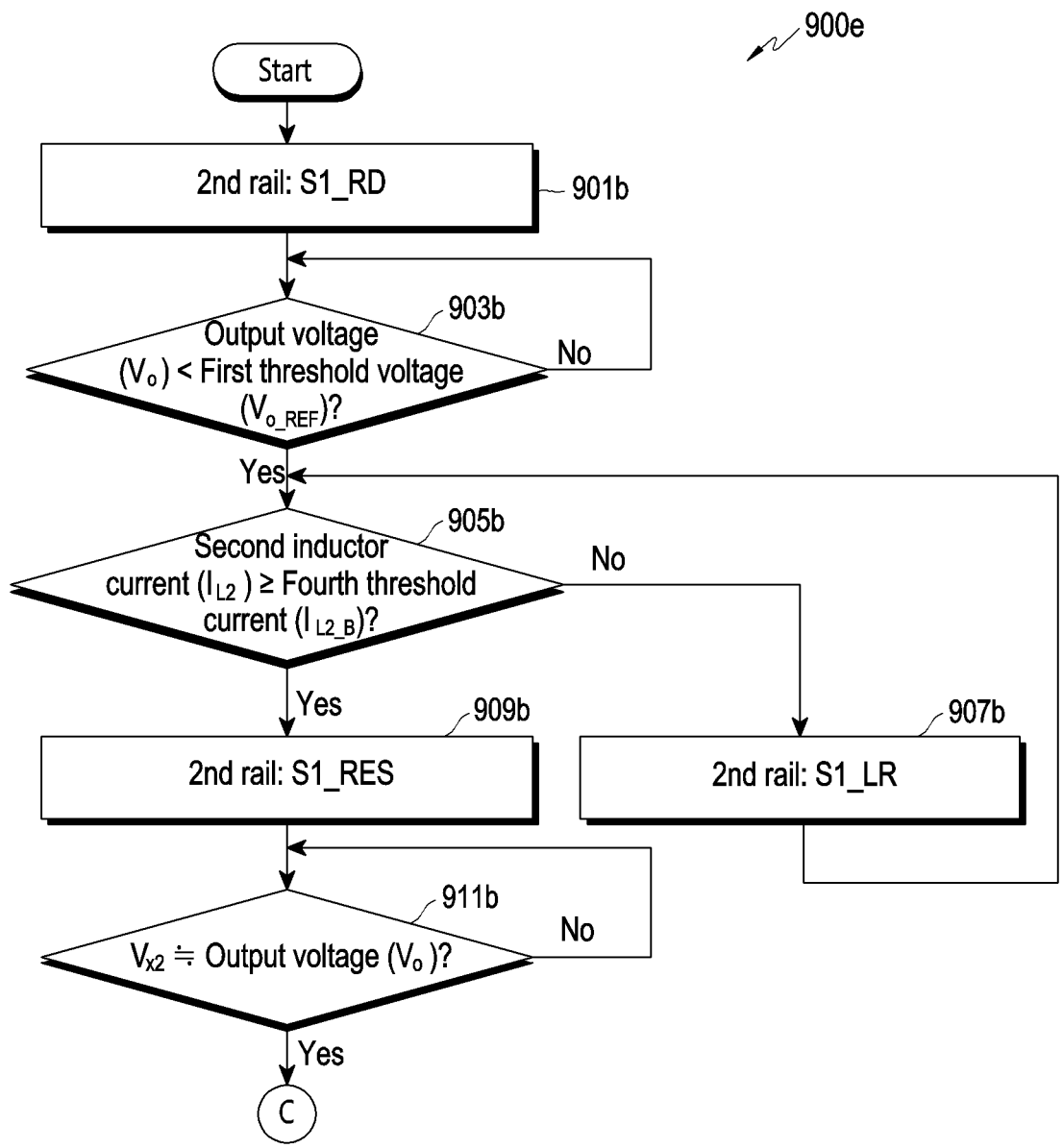
FIGS. 9E and 9F are flowcharts illustrating a method in which a DC/DC converter controls an on/off state of multiple second switches according to various embodiments of the disclosure.
Figure 9F:
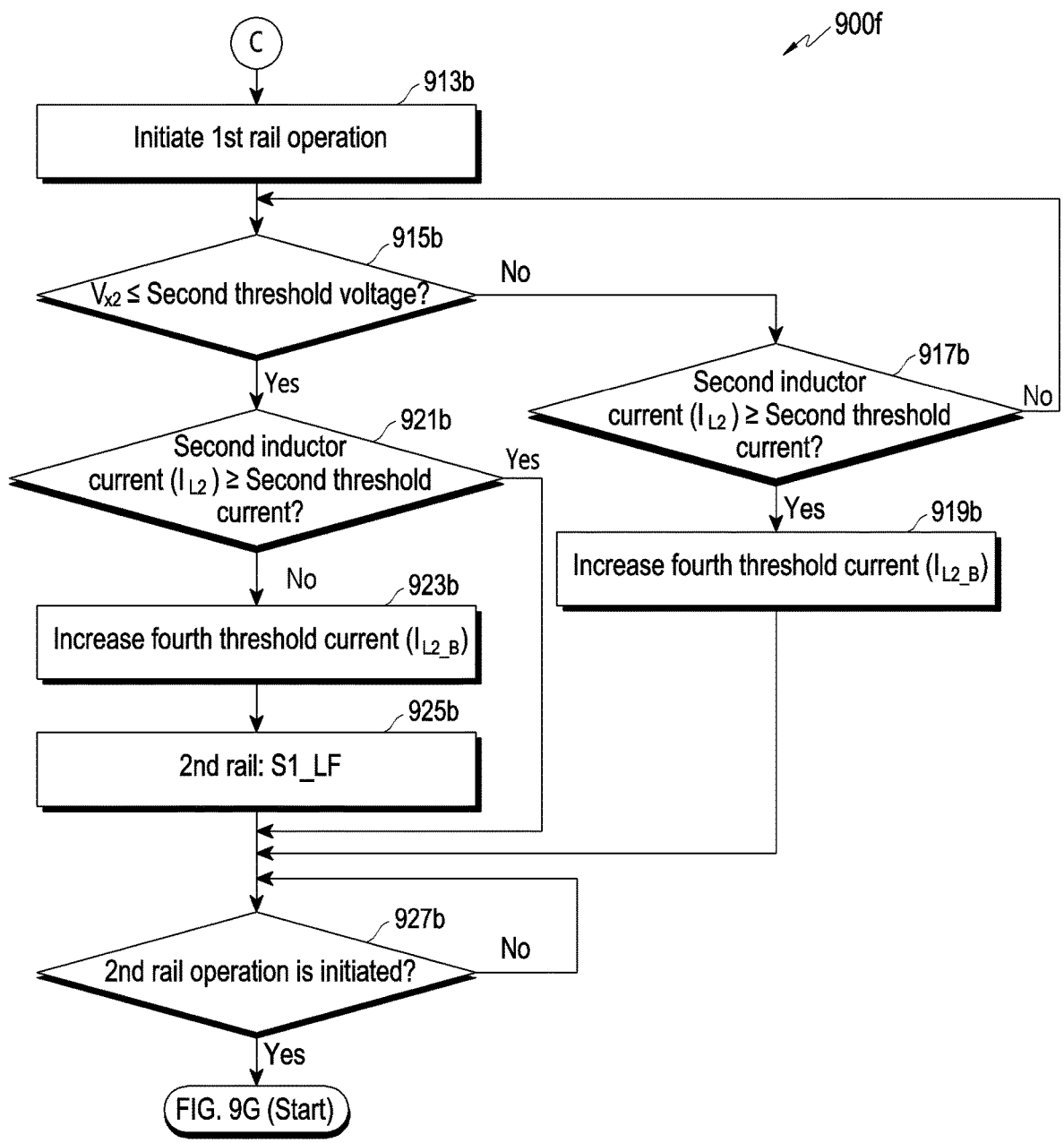
Figure 9G:
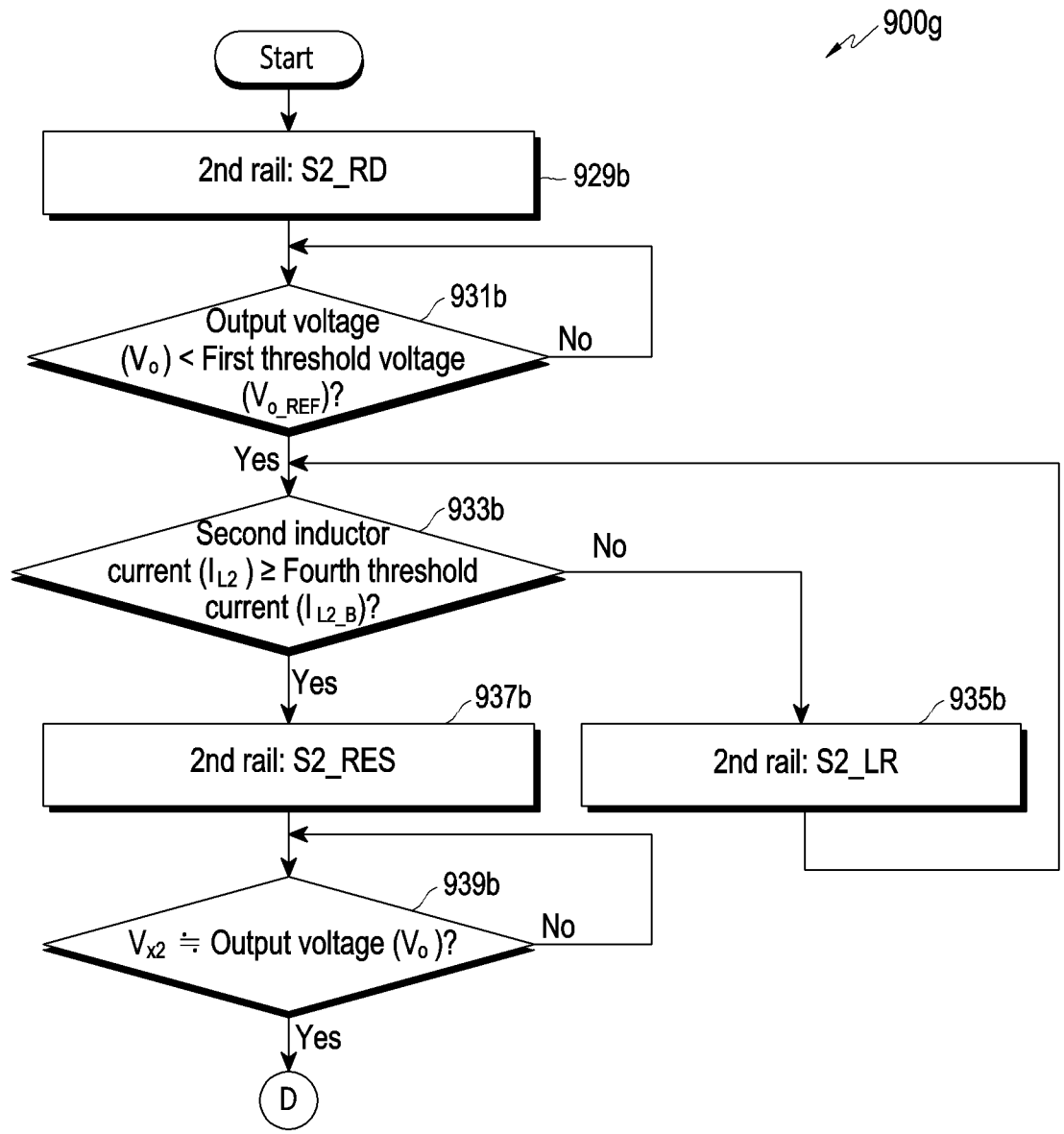
FIGS. 9G and 9H are flowcharts illustrating a method in which a DC/DC converter controls an on/off state of multiple second switches according to various embodiments of the disclosure.
Figure 9H:
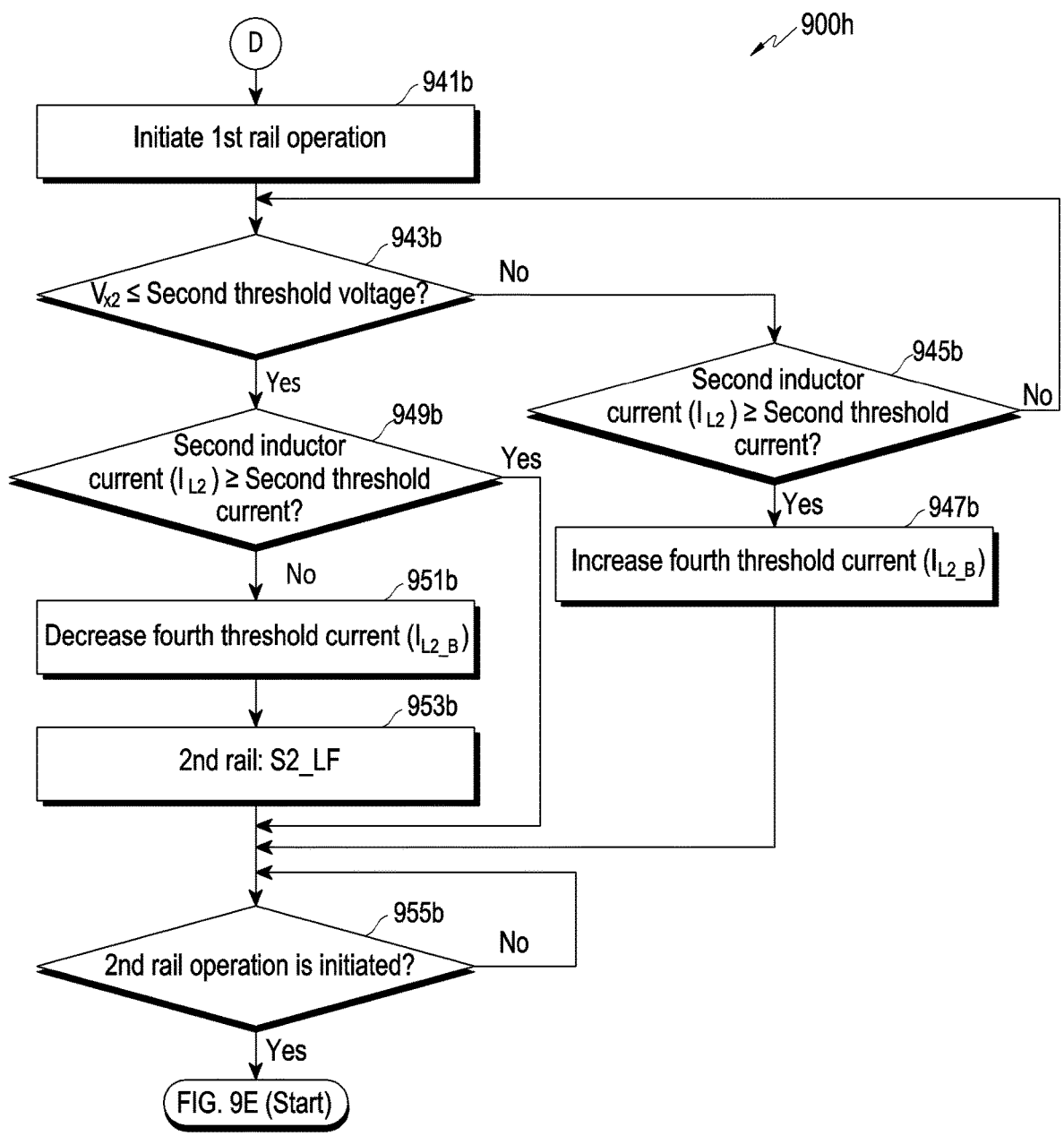
Figure 10:
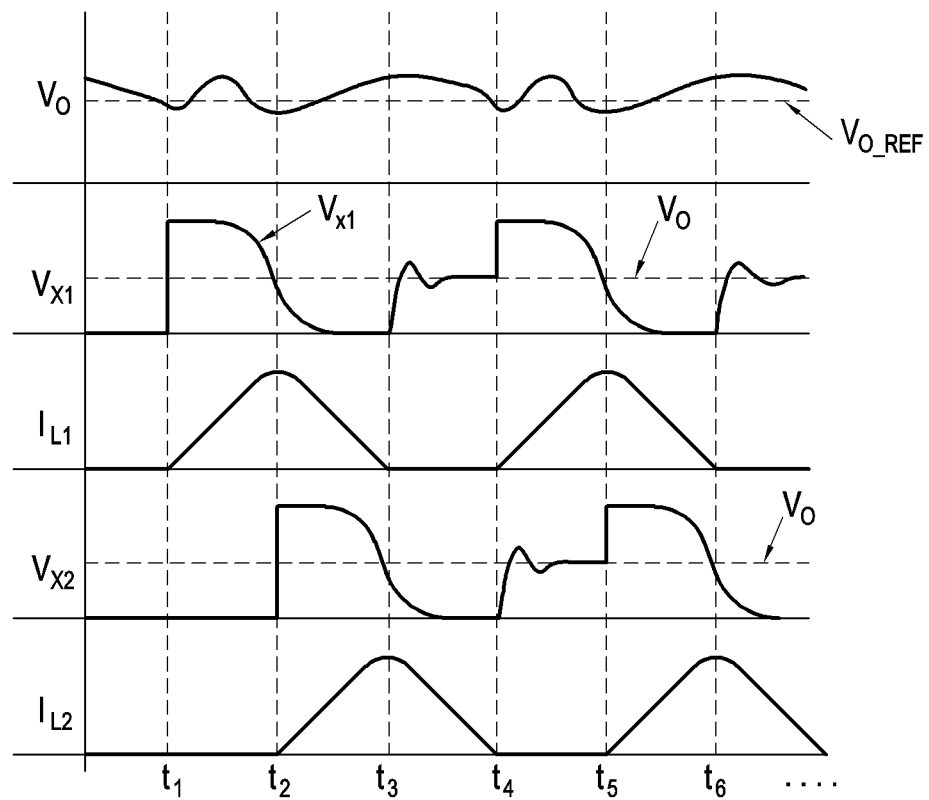
FIG. 10 illustrates a method in which a DC/DC converter controls an on/off state of multiple switches according to an embodiment of the disclosure.

FIGS. 9A and 9B are flowcharts 900a and 900b illustrating a method in which a DC/DC converter controls an on/off state of multiple first switches according to various embodiments of the disclosure. FIGS. 9C and 9D are flowcharts 900c and 900d illustrating a method in which a DC/DC converter 800 controls an on/off state of multiple first switches according to various embodiments of the disclosure. FIGS. 9E and 9F are flowcharts 900e and 900f illustrating a method in which an DC/DC converter 800 controls an on/off state of multiple second switches according to various embodiments of the disclosure. FIGS. 9G and 9H are flowcharts 900g and 900h illustrating a method in which an DC/DC converter 800 controls an on/off state of multiple second switches according to various embodiments of the disclosure. FIG. 10 illustrates a method in which an DC/DC converter 800 controls an on/off state of multiple switches according to an embodiment of the disclosure.

Referring to FIG. 9A, according to various embodiments of the disclosure, in operation 901a, the DC/DC converter 800 may, with regard to the $1^{st}$ rail, control the on/off state of the multiple switches 101 to correspond to the S1_RD state.

According to various embodiments of the disclosure, with regard to the $1^{st}$ rail, the DC/DC converter 800 may maintain the on/off state of the multiple switches 101 to correspond to the S1_RD state when the output voltage $V_o$ is equal to or greater than the first threshold voltage $V_{o\_REF}$ (e.g., "No" in operation 903a).

According to various embodiments of the disclosure, when the output voltage $V_o$ is less than the first threshold voltage $V_{o\_REF}$ (e.g., "Yes" in operation 903a), if a first inductor current $I_{L1}$ (e.g., the inductor current $I_L$) is less than a third threshold current $I_{L1\_B}$ (e.g., the first threshold current $I_{L\_B}$) (e.g., "No" in operation 905a), the DC/DC converter 800 may control, with regard to the $1^{st}$ rail, the on/off state of the multiple switches 101 to correspond to the S1_LR state in operation 907a.

According to various embodiments of the disclosure, when operation 903a is determined to be "Yes" or after operation 907a, if the first inductor current $I_{L1}$ is equal to or greater than the third threshold current $I_{L1\_B}$ (e.g., "Yes" in operation 905a), the DC/DC converter 800 may control, with regard to the $1^{st}$ rail, the on/off state of the multiple first switches 101 to correspond to the S1_RES state in operation 909a.

According to various embodiments of the disclosure, after operation 909a, if the switch node voltage $V_{x1}$ (e.g., switch node voltage $V_x$) is equal to the output voltage $V_o$ (or the output reference voltage $V_{o\_REF}$) (e.g., if the first switch node voltage $V_{x1}$ decreases to such an extent that the difference between the first switch node voltage $V_{x1}$ and the output voltage $V_o$ (or the output reference voltage $V_{o\_REF}$) is within a designated error range) (e.g., "Yes" in operation 911a), the DC/DC converter 800 may perform operation 913a of FIG. 9B. For example, referring to FIG. 10, a time point $t_2$ at which the first switch node voltage $V_{x1}$ becomes equal to the output voltage $V_o$ (or the output reference voltage $V_{o\_REF}$) may be the same as the time point at which the first inductor current $I_{L1}$ has the maximum value (e.g., the maximum point of the first inductor current $I_{L1}$). Further, the time point $t_2$ may be described as the time point at which the slope of the first inductor current $I_{L1}$ is 0.

According to various embodiments of the disclosure, after operation 909a, before the first switch node voltage $V_{x1}$ becomes equal to the output voltage $V_o$ (or the output reference voltage $V_{o\_REF}$) (e.g., before the first switch node voltage $V_{x1}$ decreases to such an extent that the difference between the first switch node voltage $V_{x1}$ and the output voltage $V_o$ (or the output reference voltage $V_{o\_REF}$) is within a designated error range (e.g., "No" in operation 911a), the DC/DC converter 800 may, with regard to the $1^{st}$ rail, maintain the on/off state of the multiple switches 101 to correspond to the S1_RES state.

Referring to FIG. 9B, according to various embodiments of the disclosure, the DC/DC converter 800 may start the operation of the $2^{nd}$ rail in operation 913a. For example, the DC/DC converter 800 may start to perform operation 901b of FIG. 9E, which will be described later.

According to various embodiments of the disclosure, after operation 913a, when the first switch node voltage $V_{x1}$ (e.g., $V_{in}-V_{cfly}$) is greater than a second threshold voltage (e.g., 0 V) (e.g., $V_{cfly}$ is not increased to $V_{in}$ or more) (e.g., "No" in operation 915a), if the first inductor current $I_{L1}$ is equal to or less than a second threshold current (e.g., 0 A) (e.g., "Yes" in operation 917a), the DC/DC converter 800 may increase the third threshold current $I_{L1\_B}$ in operation 919a.

According to various embodiments of the disclosure, after operation 919a, the DC/DC converter 800 may perform operation 927a.

According to various embodiments of the disclosure, after operation 913a, when the first switch node voltage $V_{x1}$ (e.g., $V_{in}-V_{cfly}$) is greater than a second threshold voltage (e.g., 0 V) (e.g., $V_{cfly}$ is not increased to yin or more) (e.g., "No" in operation 915a), if the first inductor current $I_{L1}$ is greater than the second threshold current (e.g., 0 A) (e.g., "No" in operation 917a), the DC/DC converter 800 may perform operations according to operation 915a.

According to various embodiments of the disclosure, after operation 913a, when the first switch node voltage $V_{x1}$ (e.g., $V_{in}-V_{cfly}$) is equal to or less than a second threshold voltage (e.g., 0 V) (e.g., "Yes" in operation 915a), if the first inductor current $I_{L1}$ is greater than a second threshold current (e.g., 0 A) (e.g., if $V_{cfly}$ is increased to $V_{in}$ or more and then the first inductor current $I_{L1}$ is decreased to the second threshold current or less (e.g., "No" in operation 921a), the DC/DC converter 800 may decrease the third threshold current $I_{L1\_B}$ in operation 923a. The DC/DC converter 800 may decrease the third threshold current $I_{L1\_B}$ in order to shorten the length of period of the S1_LR state. According to an embodiment of the disclosure, when the first switch node voltage $V_{x1}$ (e.g., $V_{in}-V_{cfly}$) is equal to or less than a second threshold voltage (e.g., 0 V) (e.g., "Yes" in operation 915a) and the first inductor current $I_{L1}$ is equal to or less than a second threshold current (e.g., 0 A) (e.g., "Yes" in operation 921a), if the output voltage $V_o$ is decreased less than the first threshold voltage $V_{o\_REF}$, the DC/DC converter 100 may increase the third threshold current $I_{L1\_B}$ (e.g., operation 919a). According to an embodiment of the disclosure, when the first switch node voltage $V_{x1}$ (e.g., $V_{in}-V_{cfly}$) is equal to or less than a second threshold voltage (e.g., 0 V) (e.g., "Yes" in operation 915a) and the first inductor current $I_{L1}$ is equal to or less than a second threshold current (e.g., 0 A) (e.g., "Yes" in operation 921a), if the output voltage $V_o$ does not decrease below the first threshold voltage $V_{o\_REF}$, the DC/DC converter 100 may maintain the third threshold current $I_{L1\_B}$.

According to various embodiments of the disclosure, after operation 923a, the DC/DC converter 800 may control, with regard to the $1^{st}$ rail, the on/off state of the multiple first switches 101 to correspond to the S1_LF state in operation 925a.

According to various embodiments of the disclosure, after operation 925a, the DC/DC/converter 800 may determine whether to start an operation with respect to the $1^{st}$ rail in operation 927a. For example, if a second switch node voltage $V_{x2}$ to be described later is equal to the output voltage $V_o$ (or the output reference voltage $V_{o\_REF}$) (e.g., if the second switch node voltage $V_{x2}$ is decreased to such an extent that the difference between the second switch node voltage $V_{x2}$ and the output voltage $V_o$ (or the output reference voltage $V_{o\_REF}$) is within a designated error range) (e.g., "Yes" in operation 927a), the DC/DC converter 800 may perform operation (e.g., operation 929a) of FIG. 9C, if not, the DC/DC converter may be in standby.

Referring to FIG. 9C, according to various embodiments of the disclosure, in operation 929a, the DC/DC converter 800 may, with regard to the $1^{st}$ rail, control the on/off state of the multiple switches 101 to correspond to the S2_RD state.

According to various embodiments of the disclosure, if the output voltage $V_o$ is equal to or greater than the first threshold voltage $V_{o\_REF}$ (e.g., "No" in operation 931a), the DC/DC converter 800 may, with regard to the Pt rail, maintain the on/off state of the multiple first switches 101 to correspond to the S2_RD state. For example, even if it is determined to start the operation of the $1^{st}$ rail in operation 927a (e.g., when the second switch node voltage $V_{x2}$ becomes equal to the output voltage $V_o$ (or the output reference voltage $V_{o\_REF}$)), when the output voltage $V_o$ is equal to or greater than the first threshold voltage $V_{o\_REF}$ (e.g., "No" in operation 931a), the DC/DC converter 800 may maintain the S2_RD state. For example, referring to FIG. 10, during period of $t_4$ to is in which the output voltage $V_o$ is equal to or greater than the output reference voltage $V_{o\_REF}$, the moments when the second switch node voltage $V_{x2}$ becomes equal to the output voltage $V_o$ (or the output reference voltage $V_{o\_REF}$) may occur. During period of $t_4$ to is in which the output voltage $V_o$ is equal to or greater than the output reference voltage $V_{o\_REF}$, even if the second switch node voltage $V_{x2}$ becomes equal to the output voltage $V_o$ (or the output reference voltage $V_{o\_REF}$), the DC/DC converter 800 may maintain the on/off state of the multiple first switches 101 to correspond to the S2_RD state.

According to various embodiments of the disclosure, when the output voltage $V_o$ is less than the first threshold voltage $V_{o\_REF}$ (e.g., "Yes" in operation 929a), if a first inductor current $I_{L1}$ (e.g., the inductor current $I_L$) is less than a third threshold current $I_{L1\_B}$ (e.g., the first threshold current $I_{L\_B}$) (e.g., "No" in operation 933a), the DC/DC converter 800 may control, with regard to the $1^{st}$ rail, the on/off state of the multiple switches 101 to correspond to the S2_LR state in operation 935a.

According to various embodiments of the disclosure, when operation 931a is determined to be "Yes" or after operation 935a, if the first inductor current $I_{L1}$ is equal to or greater than the third threshold current $I_{L1\_B}$ (e.g., "Yes" in operation 933a), the DC/DC converter 800 may control, with regard to the $1^{st}$ rail, the on/off state of the multiple switches 101 to correspond to the S2_RES state in operation 937a.

According to various embodiments of the disclosure, after operation 937a, if the switch node voltage $V_{x1}$ (e.g., switch node voltage $V_x$) is equal to the output voltage $V_o$ (or the output reference voltage $V_{o\_REF}$) (e.g., if the first switch node voltage $V_{x1}$ decreases to such an extent that the difference between the first switch node voltage $V_{x1}$ and the output voltage $V_o$ (or the output reference voltage $V_{o\_REF}$) is within a designated error range) (e.g., "Yes" in operation 939a), the DC/DC converter 800 may perform operation 941a of FIG. 9D. For example, referring to FIG. 10, time point $t_5$ at which the first switch node voltage $V_{x1}$ becomes equal to the output voltage $V_o$ (or the output reference voltage $V_{o\_REF}$) may be the same as a time point at which the first inductor current $I_{L1}$ has the maximum value (e.g., the maximum point of the first inductor current $I_{L1}$). Further, time point is may be referred to as the time point at which the slope of the first inductor current $I_{L1}$ is 0.

According to various embodiments of the disclosure, after operation 937a, before the first switch node voltage $V_{x1}$ becomes equal to the output voltage $V_o$ (or the output reference voltage $V_{o\_REF}$) (e.g., before the first switch node voltage $V_{x1}$ decreases to such an extent that the difference between the first switch node voltage $V_{x1}$ and the output voltage $V_o$ (or the output reference voltage $V_{o\_REF}$) is within a designated error range (e.g., "No" in operation 939a), the DC/DC converter 800 may, with regard to the $1^{st}$ rail, maintain the on/off state of the multiple switches 101 to correspond to the S2_RES state.

Referring to FIG. 9D, according to various embodiments of the disclosure, the DC/DC converter 800 may start the operation of the $2^{nd}$ rail in operation 941a. For example, in operation 941a, the DC/DC converter 800 may start to perform operation 929b of FIG. 9G, which will be described later.

According to various embodiments of the disclosure, after operation 941a, when the first switch node voltage $V_{x1}$ (e.g., $V_{cfly}$) is greater than a second threshold voltage (e.g., 0 V) (e.g., $V_{cfly}$ is not decreased to the second threshold voltage or less) (e.g., "No" in operation 943a), if the first inductor current $I_{L1}$ is equal to or less than the second threshold current (e.g., 0 A) (e.g., "Yes" in operation 945a), the DC/DC converter 800 may increase the third threshold current $I_{L1\_B}$ in operation 947a.

According to various embodiments of the disclosure, after operation 947a, the DC/DC converter 800 may perform operation 955a.

According to various embodiments of the disclosure, after operation 941a, when the first switch node voltage $V_{x1}$ (e.g., $V_{cfly}$) is greater than a second threshold voltage (e.g., 0 V) (e.g., before $V_{cfly}$ is decreased to the second threshold voltage or less) (e.g., "No" in operation 943a), if the first inductor current $I_{L1}$ is greater than the second threshold current (e.g., 0 A) (e.g., "No" in operation 947a), the DC/DC converter 800 may perform operations according to operation 943a.

According to various embodiments of the disclosure, after operation 941a, when the first switch node voltage $V_{x1}$ (e.g., $V_{cfly}$) is equal to or less than a second threshold voltage (e.g., 0 V) (e.g., "Yes" in operation 943a), if the first inductor current $I_{L1}$ is greater than a second threshold current (e.g., 0 A) (e.g., "No" in operation 949a) (e.g., if $V_{cfly}$ is decreased to 0 or less and then the first inductor current $I_{L1}$ is decreased to the second threshold current or less), the DC/DC converter 800 may decrease the third threshold current $I_{L1\_B}$ in operation 951a. The DC/DC converter 800 may decrease the third threshold current $I_{L1\_B}$ in order to shorten the length of period of the S1_LR state. According to an embodiment of the disclosure, when the first switch node voltage $V_{x1}$ (e.g., $V_{cfly}$) is equal to or less than a second threshold voltage (e.g., 0 V) (e.g., "Yes" in operation 943a) and the first inductor current $I_{L1}$ is equal to or less than a second threshold current (e.g., 0 A) (e.g., "Yes" in operation 949a), if the output voltage $V_o$ is decreased less than the first threshold voltage $V_{o\_REF}$, the DC/DC converter 100 may increase the third threshold current $I_{L1\_B}$ (e.g., operation 947a). According to an embodiment of the disclosure, when the first switch node voltage $V_{L1}$ (e.g., $V_{cfly}$) is equal to or less than a second threshold voltage (e.g., 0 V) (e.g., "Yes" in operation 943a)

and the first inductor current $I_{L1}$ is equal to or less than a second threshold current (e.g., 0 A) (e.g., "Yes" in operation 949a), if the output voltage $V_o$ does not decrease below the first threshold voltage $V_{o\_REF}$, the DC/DC converter 100 may maintain the third threshold current $I_{L1\_B}$.

According to various embodiments of the disclosure, after operation 951a, the DC/DC converter 800 may control, with regard to the $1^{st}$ rail, the on/off state of the multiple first switches 101 to correspond to the S2_LF state in operation 953a.

According to various embodiments of the disclosure, after operation 953a, the DC/DC/converter 800 may determine whether to start an operation with respect to the $1^{st}$ rail in operation 955a. For example, if a second switch node voltage $V_{x2}$ to be described later is equal to the output voltage $V_o$ (or the output reference voltage $V_{o\_REF}$) (e.g., if the second switch node voltage $V_{x2}$ decreases to such an extent that the difference between the second switch node voltage $V_{x2}$ and the output voltage $V_o$ (or the output reference voltage $V_{o\_REF}$) is within a designated error range) (e.g., "Yes" in operation 955a), the DC/DC converter 800 may perform operation (e.g., operation 901a) of FIG. 9A, if not, the DC/DC converter may be in standby.

Referring to FIG. 9E, according to various embodiments of the disclosure, in operation 901b, the DC/DC converter 800 may, with regard to the $2^{nd}$ rail, control the on/off state of the multiple second switches 109 to correspond to the S1_RD state. According to various embodiments of the disclosure, the DC/DC converter 800 may perform operation 901b when it is determined to start the operation of the $2^{nd}$ rail in operation 913a described above.

According to various embodiments of the disclosure, if the output voltage $V_o$ is equal to or greater than the first threshold voltage $V_{o\_REF}$ (e.g., "No" in operation 903b), the DC/DC converter 800 may, with regard to the $2^{nd}$ rail, maintain the on/off state of the multiple second switches 109 to correspond to the S1_RD state. For example, even if it is determined to start the operation of the $2^{nd}$ rail (e.g., when the first switch node voltage $V_{x1}$ becomes equal to the output voltage $V_o$ (or the output reference voltage $V_{o\_REF}$), the DC/DC converter 800 may maintain the S1_RD state when the output voltage $V_o$ is equal to or greater than the first threshold voltage $V_{o\_REF}$ (e.g., "No" in operation 903b). For example, referring to FIG. 10, during the period of $t_3$ to $t_4$ in which the output voltage $V_o$ is equal to or greater than the output reference voltage $V_{o\_REF}$, the moments when the first switch node voltage $V_{x1}$ becomes equal to the output voltage $V_o$ (or the output reference voltage $V_{o\_REF}$) may occur. During the period of $t_3$ to $t_4$ in which the output voltage $V_o$ is equal to or greater than the output reference voltage $V_{o\_REF}$, even if the first switch node voltage $V_{x1}$ becomes equal to the output voltage $V_o$ (or the output reference voltage $V_{o\_REF}$), the DC/DC converter 800 may maintain the on/off state of the multiple second switches 109 to correspond to the S1_RD state.

According to various embodiments of the disclosure, when the output voltage $V_o$ is less than the first threshold voltage $V_{o\_REF}$ (e.g., "Yes" in operation 903b), if a second inductor current $I_{L2}$ is less than a fourth threshold current $I_{L2\_B}$ (e.g., "No" in operation 905b), the DC/DC converter 800 may control, with regard to the $2^{nd}$ rail, the on/off state of the multiple second switches 109 to correspond to the S1_LR state in operation 907b. For example, the fourth threshold current $I_{L2\_B}$ may be configured independently of the above-described third threshold current $I_{L1\_B}$, and may be independently changed according to the result of operation 919b, operation 923b, operation 947b, or operation 951b, regardless of a change in the third threshold current $I_{L1\_B}$. For example, the fourth threshold current $I_{L2\_B}$ is configured to be the same as the above-described third threshold current $I_{L1\_B}$, and when the fourth threshold current $I_{L2\_B}$ is changed, the third threshold current $I_{L1\_B}$ may also be changed.

According to various embodiments of the disclosure, when operation 903b is determined to be "Yes" or after operation 907b, if the second inductor current $I_{L2}$ is equal to or greater than the fourth threshold current $I_{L2\_B}$ (e.g., "Yes" in operation 905b), the DC/DC converter 800 may control, with regard to the $2^{nd}$ rail, the on/off state of the multiple second switches 109 to correspond to the S1_RES state in operation 909b.

According to various embodiments of the disclosure, after operation 909b, if the switch node voltage $V_{x2}$ is equal to the output voltage $V_o$ (or the output reference voltage $V_{o\_REF}$) (e.g., if the second switch node voltage $V_{x2}$ decreases to such an extent that the difference between the second switch node voltage $V_{x2}$ and the output voltage $V_o$ (or the output reference voltage $V_{o\_REF}$) is within a designated error range) (e.g., "Yes" in operation 911b), the DC/DC converter 800 may perform operation 913b of FIG. 9F. For example, referring to FIG. 10, the time point $t_3$ at which the first switch node voltage $V_{x1}$ becomes equal to the output voltage $V_o$ (or the output reference voltage $V_{o\_REF}$) may be the same as the time point at which the second inductor current $I_{L2}$ has the maximum value (e.g., the maximum point of the second inductor current $I_{L2}$). Further, the time point $t_3$ may be referred to as the time point at which the slope of the second inductor current $I_{L2}$ is 0.

According to various embodiments of the disclosure, after operation 909b, before the second switch node voltage $V_{x2}$ becomes equal to the output voltage $V_o$ (or the output reference voltage $V_{o\_REF}$) (e.g., before the second switch node voltage $V_{x2}$ decreases to such an extent that the difference between the second switch node voltage $V_{x2}$ and the output voltage $V_o$ (or the output reference voltage $V_{o\_REF}$) is within a designated error range) (e.g., "No" in operation 911b, the DC/DC converter 800 may, with regard to the $2^{nd}$ rail, maintain the on/off state of the multiple second switches 109 to correspond to the S1_RES state.

Referring to FIG. 9F, according to various embodiments of the disclosure, the DC/DC converter 800 may start the operation of the Pt rail in operation 913b. For example, in operation 913b, the DC/DC converter 800 may start to perform operation 901a of FIG. 9A described above.

According to various embodiments of the disclosure, after operation 913b, when the second switch node voltage $V_{x2}$ is greater than a second threshold voltage (e.g., 0 V) (e.g., "No" in operation 915b), if the second inductor current $I_{L2}$ is equal to or less than the second threshold current (e.g., 0 A) (e.g., "Yes" in operation 917b), the DC/DC converter 800 may increase the fourth threshold current $II_{L2\_B}$ in operation 919b.

According to various embodiments of the disclosure, after operation 919b, the DC/DC converter 800 may perform operation 927b.

According to various embodiments of the disclosure, after operation 913b, when the second switch node voltage $V_{x2}$ is greater than a second threshold voltage (e.g., 0 V) (e.g., "No" in operation 915b), if the second inductor current $I_{L2}$ is greater than the second threshold current (e.g., 0 A) (e.g., "No" in operation 917b), the DC/DC converter 800 may perform operations according to operation 915b.

According to various embodiments of the disclosure, after operation 913b, when the second switch node voltage $V_{x2}$ is equal to or less than a second threshold voltage (e.g., 0 V) (e.g., "Yes" in operation 915b), if the second inductor current $I_{L2}$ is greater than a second threshold current (e.g., 0 A) (e.g., if the second switch node voltage $V_{x2}$ decreases to the second threshold voltage or less and then the second inductor current $I_{L2}$ is decreased to the second threshold current or less) (e.g., "No" in operation 921b), the DC/DC converter 800 may decrease the fourth threshold current $II_{L2\_B}$ in operation 923b. For example, the DC/DC converter 800 may decrease the fourth threshold current $I_{L2\_B}$ in order to shorten the length of period of the S1_LR state. According to an embodiment of the disclosure, when the second switch node voltage $V_{x2}$ is equal to or less than a second threshold voltage (e.g., 0 V) (e.g., "Yes" in operation 915b) and the second inductor current $I_{L2}$ is equal to or less than a second threshold current (e.g., 0 A) (e.g., "Yes" in operation 921b), if the output voltage $V_o$ is decreased less than the first threshold voltage $V_{o\_REF}$, the DC/DC converter 800 may increase the fourth threshold current $II_{L2\_B}$ (e.g., operation 919b). According to an embodiment of the disclosure, when the second switch node voltage $V_{x2}$ is equal to or less than a second threshold voltage (e.g., 0 V) (e.g., "Yes" in operation 915b) and the second inductor current $I_{L2}$ is equal to or less than a second threshold current (e.g., 0 A) (e.g., "Yes" in operation 921b), if the output voltage $V_o$ does not decrease below the first threshold voltage $V_{o\_REF}$, the DC/DC converter 800 may maintain the fourth threshold current $I_{L2\_B}$.

According to various embodiments of the disclosure, after operation 923b, the DC/DC converter 800 may control, with regard to the $2^{nd}$ rail, the on/off state of the multiple second switches 109 to correspond to the S2_LF state in operation 925b.

According to various embodiments of the disclosure, after operation 925b, the DC/DC/converter 800 may determine whether to start an operation with respect to the $2^{nd}$ rail in operation 927b. For example, if the first switch node voltage $V_{x1}$ described above is equal to the output voltage $V_o$ (or the output reference voltage $V_{o\_REF}$) (e.g., if the first switch node voltage $V_{x1}$ decreases to such an extent that the difference between the first switch node voltage $V_{x1}$ and the output voltage $V_o$ (or the output reference voltage $V_{o\_REF}$) is within a designated error range) (e.g., "Yes" in operation 927b), the DC/DC converter 800 may perform operation 929b of FIG. 9G, if not, the DC/DC converter may be in standby.

Referring to FIG. 9G, according to various embodiments of the disclosure, in operation 929b, the DC/DC converter 800 may, with regard to the $2^{nd}$ rail, control the on/off state of the multiple second switches 109 to correspond to the S2_RD state.

According to various embodiments of the disclosure, if the output voltage $V_o$ is equal to or greater than the first threshold voltage $V_{o\_REF}$ (e.g., "No" in operation 931b), the DC/DC converter 800 may, with regard to the $2^{nd}$ rail, maintain the on/off state of the multiple second switches 109 to correspond to the S2_RD state. For example, even if it is determined to start the operation of the $2^{nd}$ rail in the previous operation 927b (e.g., when the first switch node voltage $V_{x1}$ becomes equal to the output voltage $V_o$ (or the output reference voltage $V_{o\_REF}$)), the DC/DC converter 800 may maintain the S2_RD state when the output voltage $V_o$ is equal to or greater than the first threshold voltage $V_{o\_REF}$ (e.g., "No" in operation 931b). For example, referring to FIG. 10, during the period of $t_6$ in which the output voltage $V_o$ is equal to or greater than the output reference voltage $V_{o\_REF}$, the moments when the first switch node voltage $V_{x1}$ becomes equal to the output voltage $V_o$ (or the output reference voltage $V_{o\_REF}$) may occur. In a period after $t_6$ in which the output voltage $V_o$ is equal to or greater than the output reference voltage $V_{o\_REF}$, even if the first switch node voltage $V_{x1}$ becomes equal to the output voltage $V_o$ (or the output reference voltage $V_{o\_REF}$), the DC/DC converter 800 may maintain the on/off state of the multiple second switches 109 to correspond to the S2_RD state.

According to various embodiments of the disclosure, when the output voltage $V_o$ is less than the first threshold voltage $V_{o\_REF}$ (e.g., "Yes" in operation 929b), if a second inductor current $I_{L2}$ is less than a fourth threshold current $I_{L2\_B}$ (e.g., "No" in operation 933b), the DC/DC converter 800 may control, with regard to the $2^{nd}$ rail, the on/off state of the multiple second switches 109 to correspond to the S2_LR state in operation 935b.

According to various embodiments of the disclosure, when operation 931b is determined to be "Yes" or after operation 935b, if the second inductor current $I_{L2}$ is equal to or greater than the fourth threshold current $I_{L2\_B}$ (e.g., "Yes" in operation 933b), the DC/DC converter 800 may control, with regard to the $2^{nd}$ rail, the on/off state of the multiple second switches 109 to correspond to the S2_RES state in operation 937b.

According to various embodiments of the disclosure, after operation 937b, if the switch node voltage $V_{x2}$ is equal to the output voltage $V_o$ (or the output reference voltage $V_{o\_REF}$) (e.g., if the second switch node voltage $V_{x2}$ decreases to such an extent that the difference between the second switch node voltage $V_{x2}$ and the output voltage $V_o$ (or the output reference voltage $V_{o\_REF}$)) is within a designated error range) (e.g., "Yes" in operation 939b), the DC/DC converter 800 may perform operation 941b of FIG. 9H. For example, referring to FIG. 10, the time point $t_6$ at which the second switch node voltage $V_{x2}$ becomes equal to the output voltage $V_o$ (or the output reference voltage $V_{o\_REF}$) may be the same as the time point at which the second inductor current $I_{L2}$ has the maximum value (e.g., the maximum point of the second inductor current $I_{L2}$). Further, the time point $t_6$ may be referred to as the time point at which the slope of the second inductor current $I_{L2}$ is 0.

According to various embodiments of the disclosure, after operation 937b, before the second switch node voltage $V_{x2}$ becomes equal to the output voltage $V_o$ (or the output reference voltage $V_{o\_REF}$) (e.g., before the second switch node voltage $V_{x2}$ decreases to such an extent that the difference between the second switch node voltage $V_{x2}$ and the output voltage $V_o$ (or the output reference voltage $V_{o\_REF}$) is within a designated error range) (e.g., "No" in operation 939b), the DC/DC converter 800 may, with regard to the $2^{nd}$ rail, maintain the on/off state of the multiple second switches 109 to correspond to the S2_RES state.

Referring to FIG. 9H, according to various embodiments of the disclosure, the DC/DC converter 800 may start the operation of the Pt rail in operation 941b. For example, in operation 929b, the DC/DC converter 800 may start to perform operation 929a of FIG. 9C described above.

According to various embodiments of the disclosure, after operation 941b, when the second switch node voltage $V_{x2}$ is greater than a second threshold voltage (e.g., 0 V) (e.g., when the second switch node voltage $V_{x2}$ is not decreased to the second threshold voltage or less) (e.g., "No" in operation 943b), if the second inductor current $I_{L2}$ is equal to or less than the second threshold current (e.g., 0 A) (e.g., "Yes" in operation 945b), the DC/DC converter 800 may increase the fourth threshold current $I_{L2\_B}$ in operation 947b.

According to various embodiments of the disclosure, after operation 947b, the DC/DC converter 800 may perform operation 955b.

According to various embodiments of the disclosure, after operation 941b, when the second switch node voltage $V_{x2}$ is greater than a second threshold voltage (e.g., 0 V) (e.g., before the second switch node voltage $V_{x2}$ decreases to the second threshold voltage or less) (e.g., "No" in operation 943b), if the second inductor current $I_{L2}$ is greater than the second threshold current (e.g., 0 A) (e.g., "No" in operation 947b), the DC/DC converter 800 may perform operations according to operation 943b.

According to various embodiments of the disclosure, after operation 941b, when the second switch node voltage $V_{x2}$ is equal to or less than a second threshold voltage (e.g., 0 V) (e.g., "Yes" in operation 943b), if the second inductor current $I_{L2}$ is greater than a second threshold current (e.g., 0 A) (e.g., "No" in operation 949b) (e.g., if the second switch node voltage $V_{x2}$ decreases to 0 or less and then the second inductor current $I_{L2}$ decreases to the second threshold current or less), the DC/DC converter 800 may decrease the fourth threshold current $II_{L2\_B}$ in operation 951b. For example, the DC/DC converter 800 may decrease the fourth threshold current $II_{L2\_B}$ in order to shorten the length of period of the S2_LR state. According to an embodiment of the disclosure, when the second switch node voltage $V_{x2}$ is equal to or less than a second threshold voltage (e.g., 0 V) (e.g., "Yes" in operation 943b) and the second inductor current $I_{L2}$ is equal to or less than a second threshold current (e.g., 0 A) (e.g., "Yes" in operation 949b), if the output voltage $V_o$ is decreased less than the first threshold voltage $V_{o\_REF}$, the DC/DC converter 800 may increase the fourth threshold current $II_{L2\_B}$ (e.g., operation 947b). According to an embodiment of the disclosure, when the second switch node voltage $V_o$ is equal to or less than a second threshold voltage (e.g., 0 V) (e.g., "Yes" in operation 943b) and the second inductor current $I_{L2}$ is equal to or less than a second threshold current (e.g., 0 A) (e.g., "Yes" in operation 949b), if the output voltage $V_o$ does not decrease below the first threshold voltage $V_{o\_REF}$, the DC/DC converter 800 may maintain the fourth threshold current $II_{L2\_B}$.

According to various embodiments of the disclosure, after operation 951b, the DC/DC converter 800 may control, with regard to the $2^{nd}$ rail, the on/off state of the multiple second switches 109 to correspond to the S2_LF state in operation 953b.

According to various embodiments of the disclosure, after operation 953b, the DC/DC/converter 800 may determine whether to start an operation with respect to the $2^{nd}$ rail in operation 955b. For example, if the first switch node voltage $V_{x1}$ described above becomes equal to the output voltage $V_o$ (or the output reference voltage $V_{o\_REF}$) (e.g., if the first switch node voltage $V_{x1}$ decreases to such an extent that the difference between the first switch node voltage $V_{x1}$ and the output voltage $V_o$ (or the output reference voltage $V_{o\_REF}$) is within a designated error range) (e.g., "Yes" in operation 955b), the DC/DC converter 800 may perform operation 901b of FIG. 9E, if not, the DC/DC converter may be in standby.

According to various embodiments of the disclosure, a DC/DC converter (e.g., the DC/DC converter 100 of FIG. 1) may include multiple switches, a capacitor, an inductor, and a controller, wherein the multiple switches include a first switch (e.g., the first switch 101a of FIG. 1) including one end connected to an input power source (e.g., the input power 1 of FIG. 1) and configured to connect one end of the capacitor (e.g., the first capacitor 103 of FIG. 1) to the input power source when the first switch is in on state, a second switch (e.g., the second switch 101b of FIG. 1) including one end connected to other end of the first switch and configured to connect the one end of the capacitor to one end of the inductor (e.g., the first inductor 105 of FIG. 1) when the second switch is in on state, a third switch (e.g., the third switch 101c of FIG. 1) including one end connected to other end of the second switch and configured to connect other end of the capacitor to the one end of the inductor when the third switch is in on state, and a fourth switch (e.g., the fourth switch 101d of FIG. 1) including one end connected to other end of the third switch and configured to connect the other end of the capacitor to ground when the fourth switch is in on state, wherein the capacitor includes the one end connected to the other end of the first switch and the one end of the second switch, and the other end connected to the other end of the third switch and the one end of the fourth switch, wherein the inductor includes the one end connected to the other end of the second switch and the one end of the third switch, and other end connected to output end of the DC/DC converter, and wherein the controller may be configured to, when output voltage (e.g., $V_o$) of the DC/DC converter is less than a first threshold voltage (e.g., $V_{o\_REF}$), based on current (e.g., inductor current $I_L$), which is output from the inductor, being less than a first threshold current (e.g., $I_{L\_B}$), control on/off state of the multiple switches so as to increase the current output from the inductor, and control the second switch and the fourth switch to be on state or control the first switch and the third switch be on state, based on the current, which is output from the inductor, being increased to be greater than or equal to the first threshold current, to allow the one end or the other end of the capacitor to be connected to the one end of the inductor.

According to various embodiments of the disclosure, the controller may be configured to control the first switch and the second switch to be on state based on the current, which is output from the inductor, being less than the first threshold current.

According to various embodiments of the disclosure, the one end of the inductor may be connected to the input power source based on the first switch and the second switch being controlled to be on state.

According to various embodiments of the disclosure, the DC/DC converter may be configured to control the second switch and the fourth switch to be on state or control the first switch and the third switch to be on state, and increase the first threshold current based on the current, which is output from the inductor, being less than or equal to a second threshold current when voltage at the other end of the second switch and at the one end of the third switch is greater than a second threshold voltage.

According to various embodiments of the disclosure, the DC/DC converter may be configured to control the second switch and the fourth switch to be on state or control the first switch and the third switch to be on state, and decrease the first threshold current based on the current, which is output from the inductor, being greater than a second threshold current when voltage at the other end of the second switch and at the one end of the third switch is equal to or less than a second threshold voltage.

According to various embodiments of the disclosure, the controller may be further configured to control the on/off state of the multiple switches so as to decrease a current output from the inductor after decreasing the first threshold current.

According to various embodiments of the disclosure, the controller may be configured to control the third switch and the fourth switch to be on state so as to decrease the current output from the inductor.

According to various embodiments of the disclosure, the one end of the inductor may be connected to the ground based on the third switch and the fourth switch being controlled to be on state.

According to various embodiments of the disclosure, the controller may be configured to maintain on state of the first switch and the second switch for a first period of time based on the current, which is output from the inductor, being less than the first threshold current.

According to various embodiments of the disclosure, the controller may be further configured to control the second switch and the fourth switch to be on state or control the first switch and the third switch to be on state, and maintain on state of the first switch and the second switch for a second period of time longer than the first period of time when the current output from the inductor is less than the first threshold current, based on the current, which is output from the inductor, being less than or equal to second threshold current when voltage at the other end of the second switch and at the one end of the third switch is greater than second threshold voltage.

According to various embodiments of the disclosure, the controller may be configured to control the second switch and the fourth switch to be on state or control the first switch and the third switch to be on state, and maintain the on state of the first switch and the second switch for a third period of time shorter than the first period of time when the current output from the inductor is less than the first threshold current, based on the current, which is output from the inductor, being greater than the second threshold current when the voltage at the other end of the second switch and at one end of the third switch is less than or equal to the second threshold voltage.

According to various embodiments of the disclosure, the capacitor and the inductor may be configured to configure a series resonance circuit when the second switch and the fourth switch are in on state or when the first switch and the third switch are in on state.

According to various embodiments of the disclosure, the controller may be further configured to, when the output voltage of the DC/DC converter is equal to or greater than the first threshold voltage, control the first switch and the fourth switch to be on state or control the second switch and the third switch to be on state.

According to various embodiments of the disclosure, a method for controlling a DC/DC converter may be provided, in which the DC/DC converter includes multiple switches, a capacitor, and an inductor, wherein the method includes, when the output voltage of the DC/DC converter is less than a first threshold voltage, based on the current, which is output from the inductor, being less than a first threshold current, controlling the on/off state of the multiple switches so as to increase the current output from the inductor, and based on the current, which is output from the inductor, being increased to be greater than or equal to the first threshold current, controlling a second switch and a fourth switch included in the multiple switches to be on state or controlling a first switch and a third switch included in the multiple switches to be on state to allow one end or other end of the capacitor to be connected to one end of the inductor, and wherein the multiple switches include the first switch including one end connected to an input power source and configured to connect the one end of the capacitor to the input power source when the first switch is in on state, the second switch including one end connected to other end of the first switch and configured to connect the one end of the capacitor to the one end of an inductor when the second switch is in on state, the third switch including one end connected to other end of the second switch and configured to connect other end of the capacitor to the one end of the inductor when the third switch is in on state, and the fourth switch including one end connected to other end of the third switch and configured to connect the other end of the capacitor to ground when the fourth switch is in on state, wherein the capacitor includes the one end connected to the other end of the first switch and the one end of the second switch, and the other end connected to the other end of the third switch and the one end of the fourth switch, and wherein the inductor includes the one end connected to the other end of the second switch and the one end of the third switch, and other end connected to output end of the DC/DC converter.

According to various embodiments of the disclosure, the controlling of the on/off state of the multiple switches so as to increase the current output from the inductor, based on the current, which is output from the inductor, being less than a first threshold current includes controlling the first switch and the second switch to be on state based on the current, which is output from the inductor, being less than the first threshold current.

According to various embodiments of the disclosure, the controlling of the DC/DC converter may further include controlling the second switch and the fourth switch to be on state or controlling the first switch and the third switch to be on state, and increasing the first threshold current based on the current, which is output from the inductor, being less than or equal to a second threshold current when voltage at the other end of the second switch and at the one end of the third switch is greater than a second threshold voltage.

According to various embodiment of the disclosure, the controlling of the DC/DC converter may further include controlling the second switch and the fourth switch to be on state or controlling the first switch and the third switch to be on state, and decreasing the first threshold current based on the current, which is output from the inductor, being greater than a second threshold current when the voltage at the other end of the second switch and at one end of the third switch is less than or equal to a second threshold voltage.

According to various embodiment of the disclosure, the controlling of the DC/DC converter may further include controlling the on/off state of the multiple switches so as to decrease a current output from the inductor after decreasing the first threshold current.

According to various embodiment of the disclosure, the controlling of the on/off state of the multiple switches so as to decrease the current output from the inductor may include controlling the third switch and the fourth switch to be on state so as to decrease the current output from the inductor.

According to various embodiment of the disclosure, the controlling of the on/off state of the multiple switches so as to increase the current output from the inductor, based on the current, which is output from the inductor, being less than a first threshold current may include maintaining on state of the first switch and the second switch for a first period of time based on the current, which is output from the inductor, being less than the first threshold current.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment of the disclosure, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each element (e.g., a module or a program) of the above-described elements may include a single entity or multiple entities, and some of the multiple entities may be separately disposed in another element. According to various embodiments of the disclosure, one or more of the above-described elements may be omitted, or one or more other elements may be added. Alternatively or additionally, a plurality of elements (e.g., modules or programs) may be integrated into a single element. In such a case, according to various embodiments of the disclosure, the integrated element may still perform one or more functions of each of the plurality of elements in the same or similar manner as they are performed by a corresponding one of the plurality of elements before the integration. According to various embodiments of the disclosure, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A direct current (DC)/DC converter comprising:
multiple switches;
a capacitor;
an inductor; and
at least one processor,
wherein the multiple switches comprise:
  a first switch including a first end connected to an input power source and being configured to connect a first end of the capacitor to the input power source when the first switch is in an on state,
  a second switch including a first end connected to a second end of the first switch and being configured to connect the first end of the capacitor to a first end of the inductor when the second switch is in the on state,
  a third switch including a first end connected to a second end of the second switch and being configured to connect a second end of the capacitor to the first end of the inductor when the third switch is in the on state, and
  a fourth switch including a first end connected to a second end of the third switch and being configured to connect the second end of the capacitor to ground when the fourth switch is in the on state,
wherein the first end of the capacitor is connected to the second end of the first switch and the first end of the second switch, and the second end of the capacitor is connected to the second end of the third switch and the first end of the fourth switch,
wherein the first end of the inductor is connected to the second end of the second switch and the first end of the third switch, and a second end of the inductor is connected to an output end of the DC/DC converter,
wherein the at least one processor is configured to:
  compare an output voltage of the DC/DC converter with a first threshold voltage, and
  compare current output from the inductor with a first threshold current, and
wherein, when the output voltage of the DC/DC converter is less than the first threshold voltage, the at least one processor is further configured to:

control an on/off state of the multiple switches so as to increase the current output from the inductor based on the current output from the inductor being less than the first threshold voltage; and control the second switch and the fourth switch to be in the on state or control the first switch and the third switch be in the on state to allow the first end or the second end of the capacitor to be connected to the first end of the inductor based on the current output from the inductor being greater than or equal to the first threshold current.

2. The DC/DC converter of claim 1, wherein the at least one processor is further configured to:
control the first switch and the second switch to be in the on state based on the current output from the inductor being less than the first threshold current.

3. The DC/DC converter of claim 2, wherein the first end of the inductor is connected to the input power source based on the first switch and the second switch being controlled to be in the on state.

4. The DC/DC converter of claim 1, wherein the at least one processor is further configured to:
control the second switch and the fourth switch to be in the on state or control the first switch and the third switch to be in the on state, and
increase the first threshold current based on the current output from the inductor being less than or equal to a second threshold current when voltage at the second end of the second switch and at the first end of the third switch is greater than a second threshold voltage.

5. The DC/DC converter of claim 1, wherein the at least one processor is further configured to:
control the second switch and the fourth switch to be in the on state or control the first switch and the third switch to be in the on state, and
decrease the first threshold current based on the current output from the inductor being greater than a second threshold current when voltage at the second end of the second switch and at the first end of the third switch is equal to or less than a second threshold voltage.

6. The DC/DC converter of claim 5, wherein the at least one processor is further configured to:
control the on/off state of the multiple switches so as to decrease the current output from the inductor after the decreasing of the first threshold current.

7. The DC/DC converter of claim 6, wherein the at least one processor is further configured to:
control the third switch and the fourth switch to be in the on state so as to decrease the current output from the inductor.

8. The DC/DC converter of claim 6, wherein the first end of the inductor is connected to the ground based on the third switch and the fourth switch being controlled to be in the on state.

9. The DC/DC converter of claim 1, wherein the at least one processor is further configured to:
maintain the on state of the first switch and the second switch for a first period of time based on the current output from the inductor being less than the first threshold current.

10. The DC/DC converter of claim 9, wherein the at least one processor is further configured to:
control the second switch and the fourth switch to be in the on state or control the first switch and the third switch to be in the on state, and
maintain the on state of the first switch and the second switch for a second period of time longer than the first period of time when the current output from the inductor is less than the first threshold current, based on the current output from the inductor being less than or equal to a second threshold current when voltage at the second end of the second switch and at the first end of the third switch is greater than a second threshold voltage.

11. The DC/DC converter of claim 9, wherein the at least one processor is further configured to:
control the second switch and the fourth switch to be in the on state or control the first switch and the third switch to be in the on state, and
maintain the on state of the first switch and the second switch for a third period of time shorter than the first period of time when the current output from the inductor is less than the first threshold current, based on the current output from the inductor being greater than a second threshold current when voltage at the second end of the second switch and at the first end of the third switch is less than or equal to a second threshold voltage.

12. The DC/DC converter of claim 1, wherein the capacitor and the inductor are configured to configure a series resonance circuit when the second switch and the fourth switch are in the on state or when the first switch and the third switch are in the on state.

13. The DC/DC converter of claim 1, wherein, when the output voltage of the DC/DC converter is equal to or greater than the first threshold voltage, the at least one processor is further configured to:
control the first switch and the fourth switch to be in the on state or control the second switch and the third switch to be in the on state.

14. A method performed by a direct current (DC)/DC converter, the DC/DC converter comprising at least one processor, multiple switches, a capacitor, and an inductor, the method comprising:
comparing, by the DC/DC converter, an output voltage of the DC/DC converter with a first threshold voltage;
comparing, by the DC/DC converter, current output from the inductor with a first threshold current; and
while the output voltage of the DC/DC converter is less than the first threshold voltage:
controlling, by the DC/DC converter, an on/off state of the multiple switches so as to increase the current output from the inductor, based on the current output from the inductor being less than the first threshold current, and
controlling, by the DC/DC converter, a second switch and a fourth switch among the multiple switches to be in an on state or controlling a first switch and a third switch among the multiple switches to be in the on state to allow a first end or a second end of the capacitor to be connected to a first end of the inductor, based on the current output from the inductor being greater than or equal to the first threshold current,
wherein the multiple switches comprise:
the first switch including a first end connected to an input power source and being configured to connect the first end of the capacitor to the input power source while the first switch is in the on state;
the second switch including a first end connected to a second end of the first switch and being configured to connect the first end of the capacitor to the first end of an inductor while the second switch is in the on state;

the third switch including a first end connected to a second end of the second switch and being configured to connect the second end of the capacitor to the first end of the inductor while the third switch is in the on state; and the fourth switch including a first end connected to a second end of the third switch and being configured to connect the second end of the capacitor to ground while the fourth switch is in the on state, wherein the first end of the capacitor is connected to the second end of the first switch and the first end of the second switch, and the second end of the capacitor is connected to the second end of the third switch and the first end of the fourth switch, and wherein the first end of the inductor is connected to the second end of the second switch and the first end of the third switch, and a second end of the inductor is connected to an output end of the DC/DC converter.

15. The method of claim 14, wherein the controlling of the on/off state of the multiple switches so as to increase the current output from the inductor, based on the current output from the inductor being less than the first threshold current, comprises controlling, by the DC/DC converter, the first switch and the second switch to be in the on state based on the current output from the inductor being less than the first threshold current.

16. The method of claim 14, further comprising:
controlling, by the DC/DC converter, the second switch and the fourth switch to be in the on state or controlling, by the DC/DC converter, the first switch and the third switch to be in the on state; and
increasing, by the DC/DC converter, the first threshold current based on the current output from the inductor being less than or equal to a second threshold current while voltage at the second end of the second switch and at the first end of the third switch is greater than a second threshold voltage.

17. The method of claim 14, further comprising:
controlling, by the DC/DC converter, the second switch and the fourth switch to be in the on state or controlling, by the DC/DC converter, the first switch and the third switch to be in the on state; and
decreasing, by the DC/DC converter, the first threshold current based on the current output from the inductor being greater than a second threshold current while voltage at the second end of the second switch and at the first end of the third switch is less than or equal to a second threshold voltage.

18. The method of claim 17, further comprising:
controlling, by the DC/DC converter, the on/off state of the multiple switches so as to decrease the current output from the inductor after the decreasing of the first threshold current.

19. The method of claim 18, wherein the controlling of the on/off state of the multiple switches so as to decrease the current output from the inductor comprises controlling, by the DC/DC converter, the third switch and the fourth switch to be in the on state so as to decease the current output from the inductor.

20. The method of claim 14, wherein the controlling of the on/off state of the multiple switches so as to increase the current output from the inductor, based on the current output from the inductor being less than the first threshold current, comprises maintaining, by the DC/DC converter, the on state of the first switch and the second switch for a first period of time based on the current output from the inductor being less than the first threshold current.

21. The method of claim 20, wherein the first end of the inductor is connected to the input power source based on the first switch and the second switch being controlled to be in the on state.

22. The method of claim 21, wherein the first end of the inductor is connected to the ground based on the third switch and the fourth switch being controlled to be in the on state.

* * * * *